US008234542B2

(12) United States Patent
Katsuragi

(10) Patent No.: US 8,234,542 B2
(45) Date of Patent: Jul. 31, 2012

(54) STORAGE CONTROLLER AND METHOD FOR CONTROLLING INPUT AND OUTPUT OF DATA BETWEEN A STORAGE APPARATUS AND A HOST COMPUTER

(75) Inventor: Eiju Katsuragi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 822 days.

(21) Appl. No.: 12/362,996

(22) Filed: Jan. 30, 2009

(65) Prior Publication Data

US 2010/0131805 A1 May 27, 2010

(30) Foreign Application Priority Data

Nov. 25, 2008 (JP) .................................. 2008-299004

(51) Int. Cl.
*G06F 11/00* (2006.01)
(52) U.S. Cl. ....................................................... 714/764
(58) Field of Classification Search ................... 714/764
See application file for complete search history.

(56) References Cited

U.S. PATENT DOCUMENTS

| 5,706,298 | A | 1/1998 | Sandorfi |
| 5,819,054 | A | 10/1998 | Ninomiya et al. |
| 6,754,680 | B1 * | 6/2004 | Motomura et al. ................. 1/1 |
| 6,842,801 | B2 * | 1/2005 | Yamada .......................... 710/56 |
| 7,155,567 | B2 * | 12/2006 | Yagi .............................. 711/113 |
| 7,849,258 | B2 * | 12/2010 | Sato et al. ....................... 711/112 |
| 7,966,471 | B2 * | 6/2011 | Katsuragi et al. ............. 711/171 |
| 7,996,712 | B2 * | 8/2011 | Tsuruta .......................... 714/6.21 |
| 2004/0210712 | A1 * | 10/2004 | Katsuragi et al. ............. 711/112 |
| 2008/0140929 | A1 | 6/2008 | Yagisawa et al. |
| 2009/0067081 | A1 * | 3/2009 | Sato et al. ....................... 360/71 |

FOREIGN PATENT DOCUMENTS

| JP | 2000-347815 | 12/2000 |
| JP | 2006-195851 | 7/2006 |

* cited by examiner

*Primary Examiner* — Christopher McCarthy
*Assistant Examiner* — Elmira Mehrmanesh
(74) *Attorney, Agent, or Firm* — Brundidge & Stanger, P.C.

(57) ABSTRACT

A storage controller detects error with relative ease when reading data from a storage apparatus. An address data appending device appends address data to each of logical blocks with respect to the data received from a host. A device communication control device determines a divisional position in every data with a size of a predetermined number of blocks, counterchanges the data in anterior and posterior parts around the divisional position, and stores the data in the storage apparatus. When reading the data from the storage apparatus, an address data checking device determines whether or not the value of the address data appended to the block read out and an expected value of the address data calculated based on the divisional position match with each other. If the values match, the data is sent to the cache memory. If the values do not match, an error is detected.

13 Claims, 22 Drawing Sheets

STORAGE CONTROLLER AND METHOD FOR CONTROLLING INPUT AND OUTPUT OF DATA BETWEEN A STORAGE APPARATUS AND A HOST COMPUTER

CROSS REFERENCES TO RELATED APPLICATIONS

This application relates to and claims priority from Japanese Patent Application No. 2008-299004, filed on Nov. 25, 2008, the entire disclosure of which is incorporated herein by reference.

BACKGROUND OF THE INVENTION

1. Field of the Invention

The present invention relates to a storage controller and a method for controlling the storage controller.

2. Description of the Related Art

Storage controllers are coupled to, for example, host computers (each hereinafter referred to as a "host") such as mainframes or servers. The storage controllers provide the hosts with storage areas based on Redundant Array of Inexpensive Disks (RAID).

In the storage controllers, it is possible, for example, to append redundancy to data as known as RAID1 through RAID6. The storage controllers append parity data to the data or write a copy of the data to another disk drive redundantly, thereby being prepared for a trouble of a disk drive.

Further, there is also known a storage controller using a security code (JP-A-2000-347815, U.S. Pat. Nos. 5,819,054 and 5,706,298). In one of the prior art references, the logical address (hereinafter referred to as an "LA") of the logical block the host computer designates as an access destination and the Longitudinal Redundancy Check (LRC) obtained by executing an EXCLUSIVE-OR operation on the data in the logical block are appended to each logical block as the security code, and the security code and the logical block are stored in the disk drive.

The LA is used for detecting an error of the address of the storage area to which the data of the logical block is to be written. The LRC is used as an error detection code for detecting an error of the data of the logical block.

In the case in which the security code is appended to the logical block, there is a possibility that the management unit of the data handled in the storage controller and the management unit of the data in the disk drive are different form each other. For example, the disk drives having the block length (the sector length) fixed to be the size of the logical block such as Serial Advanced Technology Attachment (Serial ATA) disk drives store data by logical block of fixed value. Therefore, if the security code is appended to the logical block to increase the block size, it may not be allowed to store the security code-attached logical block as it is depending on the format of the disk drive.

Therefore, in order for solving this problem, JP-A-2006-195851 (a fourth document) proposes a technology of fixing the value, which is used when inputting and outputting data to and from the disk drive, to be the least common multiple of the size of the logical block and the size of the security code-attached logical block.

SUMMARY OF THE INVENTION

As described in the fourth document, by setting the least common multiple of the size of the logical block and the size of the security code-attached logical block as a basic unit used by the storage controller when writing data to the disk drive, it is possible to write the logical block attached with the security code to the disk drive with the fixed sector length. Hereinafter, the logical block with the size increased by appending the security code is referred to as an extended logical block.

For example, assuming that the size of the logical block is 512 bytes, and the size of the security code is 8 bytes, the size of the extended logical block becomes 520 bytes. The least common multiple of 512 bytes and 520 bytes is obtained as 33280 bytes. When providing each of 64 logical blocks received from the host computer with the security code of 8 bytes, the total data size of 33280 bytes is obtained. This value is equal to the size of 65 logical blocks ($33280=512\times65$).

In this case, the both ends of the data composed of 64 extended logical blocks and the both ends of consecutive 65 logical blocks match with each other. Therefore, it is possible to store the 64 extended logical blocks into the disk drive as 65 logical blocks. The method of reading out and writing the data with the size of the least common multiple of the size of the logical block and the size of the extended logical block is referred to as, for example, data access by least common multiple in the present specification for the sake of convenience.

Incidentally, in recent years, Serial ATA disk drives are used in a relatively large number of cases as the disk drives with a fixed sector length. The Serial ATA disk drives have an advantage of a relatively large storage capacity and relatively low cost on the one hand, and have a problem of lack of reliability on the other hand.

By checking the LA described above, it is possible to immediately detect the case in which the data is read out from a wrong area. This is because the logical address as the location of the data to be read out and the LA attached to the data do not match with each other.

However, in the case in which the write data is not written in the correct location on the disk drive, it is not achievable to detect such a failure with the LA. This is because the old data thus read out is attached with the correct LA corresponding to the storage location thereof. The failure that the write data is not written in the correct location described above is referred to in the present specification as a non-writing failure. The non-writing failure includes the case in which the write data is not at all written to the disk drive, and the case in which the write data is written to a wrong storage location.

Therefore, in the case of using the disk drive inferior in reliability such as the Serial ATA disk drive, it is necessary to be prepared for occurrence of the non-writing failure described above. Consequently, there is known a method of reading out data from the disk drive immediately after the data is written thereto, and comparing the data with the data on the cache, when writing the data. This checking procedure is called a Write and Compare method.

By performing the inspection described above, the non-writing failure can be detected. However, since the data once written is read out to be compared, it takes time before completion of the writing process, and the response performance in the writing process is degraded.

Therefore, an object of the present invention is to provide a storage controller and a method of controlling the storage controller arranged to be able to improve the reliability and the response. Another object of the present invention is to provide a storage controller and a method of controlling the storage controller arranged to be able to enhance the reliability and the response even in the case in which there is a difference between a size of a first block used in a host computer and a storage apparatus and a size of a second block used in the storage controller. Further objects of the present invention will become apparent from descriptions of the embodiment described later.

In order for solving the problems described above, a storage controller according to a first aspect of the present invention is a storage controller adapted to control input and output of data between a storage apparatus handling the data by a first block and a host computer handling the data by the first block, the storage controller including a first communication control device adapted to transmit and receive the data with the host computer, an address data appending device adapted, with respect to the data, which is received by the first communication control device, and composed of one or more said first blocks, to append predetermined address data generated based on a logical address of each of the first blocks to said each of the first blocks, thereby generating data composed of one or more second blocks with a size larger than the size of the first block as much as the size of the predetermined address data, a memory device adapted to store the data composed of the second blocks appended with the predetermined address data, a second communication control device adapted to store the data, which is received from the memory device, in the storage apparatus, and to transfer the data, which is read out from the storage apparatus, to the memory device, and a checking device adapted to check correspondence between the logical address and the address data, wherein the second communication control device, when transferring the data from the memory device to the storage apparatus, generates another logical address different from the logical address of each of the first blocks based on a predetermined rule, makes said another logical address correspond to each of the second blocks of the data received from the memory device, transfers the data, which is received from the memory device, to the storage apparatus so as to be stored in the storage apparatus at a position corresponding to said another logical address, and stores correspondence between the logical address and said another logical address in a management table, the checking device, when transferring the data from the storage apparatus to the memory device, based on the correspondence obtained from the management table, reads out the data composed of the second blocks from the storage apparatus at the position corresponding to said another logical address, compares the logical address corresponding to each of the second blocks and the address data included in each of the second blocks with respect to the data composed of the second blocks and read out from said another logical address, transfers the data from the storage apparatus to the memory device in the case in which the logical address and the address data match with each other, and detects occurrence of an error in the case in which the logical address and the address data fail to match with each other.

In a second aspect of the present invention, in the storage controller according the first aspect of the present invention, the predetermined rule includes dividing the data composed of the second blocks at a divisional position designated, and counterchanging the order of the divided data.

In a third aspect of the present invention, in the storage controller according the first aspect of the present invention, the predetermined rule includes dividing the data with a predetermined size, composed of a predetermined number of said second blocks at a divisional position designated arbitrarily and a boundary of the second blocks, and counterchanging the order of the divided data.

In a fourth aspect of the present invention, in the storage controller according the second aspect of the present invention, the predetermined rule includes designating the divisional position at the head of the data composed of the second blocks, to eliminate dividing the data.

In a fifth aspect of the present invention, in the storage controller according the third aspect of the present invention, the predetermined number is a value obtained by dividing the least common multiple of the size of the first block and the size of the second block by the size of the second block.

In a sixth aspect of the present invention, in the storage controller according the second aspect of the present invention, the divisional position is changed every time the data is transferred from the memory device to the storage apparatus.

In a seventh aspect of the present invention, in the storage controller according the third aspect of the present invention, the divisional position is changed discretely by the predetermined size.

In an eighth aspect of the present invention, in the storage controller according the second aspect of the present invention, the management table stores the divisional position.

In a ninth aspect of the present invention, in the storage controller according the second aspect of the present invention, the management table stores the divisional position and validity identification data.

In a tenth aspect of the present invention, in the storage controller according the ninth aspect of the present invention, the validity identification data is set to be invalid in response to occurrence of a failure.

In an eleventh aspect of the present invention, in the storage controller according the second aspect of the present invention, a correspondence restoring part adapted, in the case in which the correspondence fails to be read out from the management table, to restore the correspondence and to re-register the correspondence in the management table is further provided, and the correspondence restoring part restores the correspondence based on the address data appended to the head block of the data composed of the second blocks.

In a twelfth aspect of the present invention, in the storage controller according the second aspect of the present invention, the divisional position is set one of using a random number or a pseudorandom number, and by adding or subtracting a predetermined value to or from the previous divisional position.

In a thirteenth aspect of the present invention, in the storage controller according the second aspect of the present invention, the first communication control device includes a first direct memory access circuit adapted to transfer data between a communication device coupled to the host computer and the memory device, the second communication device includes a second direct memory access circuit adapted to transfer data between the memory device and the storage apparatus, the address data appending device is provided in the first direct memory access circuit, the checking device is provided in the second direct memory access circuit, the size of the first block is 512 bytes, the size of the address data is 8 bytes, and the size of the second block is 520 bytes.

A method of controlling a storage controller according to a fourteenth aspect of the present invention is a method for controlling a storage controller adapted to control input and output of data between a storage apparatus and a host computer, including the steps of receiving data composed of one or more first blocks from the host computer based on a write command, generating data composed of one or more second blocks with a size larger than the size of the first block as much as a size of predetermined address data, by appending the predetermined address data generated based on a logical address of each of the first blocks to said each of the first blocks, with respect to the data, which is composed of one or more said first blocks, storing the data composed of the second blocks appended with the predetermined address data in a memory device, generating another logical address different form the logical address of each of the first blocks based on a predetermined rule, transferring the data, which is read out from the memory device, to the storage apparatus, making said another logical address correspond to each of the second block of the data read out from the memory device, so as to be stored in the storage apparatus at a position corresponding to said another logical address, storing correspondence between the logical address and said another logical address in a management table, reading out the correspondence from the management table based on a read request, reading out data composed of the second blocks from the storage apparatus at the location corresponding said another logical address based on the correspondence read out, comparing the logical address corresponding to each of the second blocks and the address data included in each of the second blocks, with respect to the data composed of the second blocks read out from said another logical address, transferring data from the storage apparatus to the memory device in the case in which the logical address and the address data match with each other, and detecting occurrence of a failure in the case in which the logical address and the address data fail to match with each other.

At least a part of a constituent or a step of the present invention might be configured as a computer program. The computer program can be fixed to a recording medium for distribution, or delivered via a network.

DESCRIPTION OF THE PREFERRED EMBODIMENTS

An embodiment of the present invention will hereinafter be explained with reference to the accompanying drawings. Firstly, the concept of the present invention will be explained, and then, a specific example will be explained. As described below, in the present invention, block data appended with address data based on a logical address is stored in a storage apparatus in a different area from the logical address. Then, in the present invention, a correspondence between the logical address and a real storage destination is stored, and managed.

Further, in the present invention, by checking whether or not an address of the data read out from the storage apparatus and an expected value of the logical address obtained from the correspondence thus stored are match with each other, whether or not the data thus read out from the storage apparatus is the desired data can be determined. In other words, in the present invention, whether or not the value of the address data actually appended to the data read out from the storage apparatus and the value of the address data expected to be appended to the data thus read out match with each other is checked.

Figure 1:
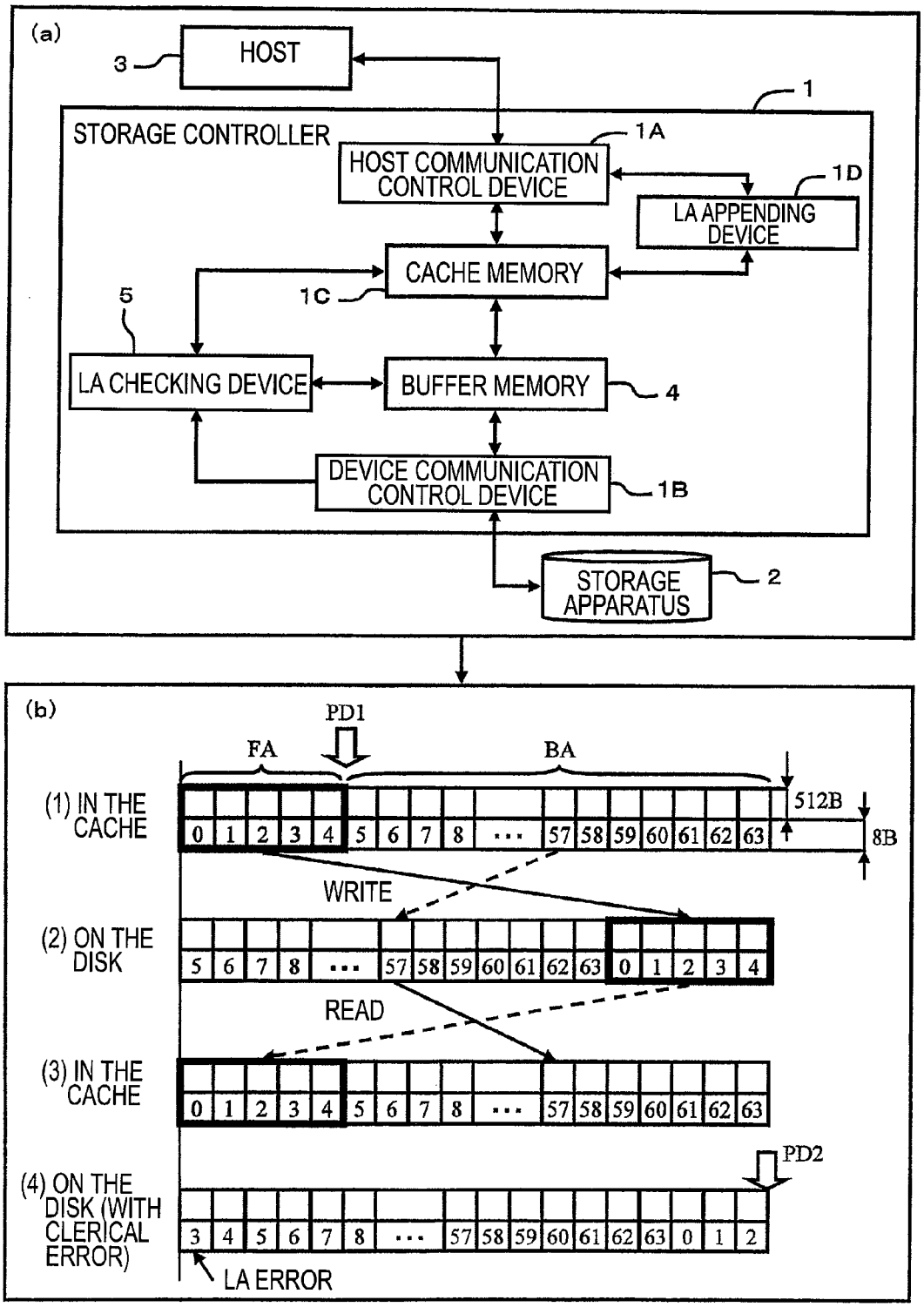
FIG. 1 is an explanatory diagram showing an overall concept of an embodiment of the present invention.

FIG. 1 is an explanatory diagram schematically showing the embodiment of the present invention. FIG. 1 and the following descriptions related to FIG. 1 show a brief summary of the present invention within the extent necessary for understanding the present invention and putting the present invention into practice, and therefore, the scope of the present invention is not at all limited to the range described in FIG. 1.

The part (a) of FIG. 1 shows an overall configuration of a storage system including a storage controller according to the present invention. The present storage system is provided with, for example, a storage controller 1, a storage apparatus 2, and a host 3.

The storage apparatus 2 is configured as a hard disk device with the sector length fixed to be the size of the logical block, such as a Serial ATA disk drive. It should be noted that in the following explanations, the physical block in the storage apparatus is referred to as a logical block for the sake of convenience.

However, in the present invention, not only the Serial ATA disk drive, but also storage apparatuses of other types such as a flash-memory device can also be used providing that the storage apparatuses have the sector length fixed to be the size of the logical block.

The host 3 is configured as a computer apparatus such as a server computer or a mainframe computer. In the case in which the host 3 is a host computer, data communications are performed according to a communication protocol such as Fibre Connection (FICON, registered trademark), Enterprise System Connection (ESCON, registered trademark), Advanced Connection Architecture (ACONARC, registered trademark), or Fibre Connection Architecture (FIBARC, registered trademark). In the case in which the host 3 is a server computer or the like, data communications are performed according to a communication protocol such as Fibre Channel Protocol (FCP) or internet Small Computer System Interface (iSCSI).

The storage controller 1 is disposed between the host 3 and the storage apparatus 2, and controls data transfer between the host 3 and the storage apparatus 2. The storage controller 1 is provided with, for example, a host communication control device 1A as a "first communication control device," a device communication control device 1B as a "second communication control device," a cache memory 1C as a "memory device," an LA appending device 1D as an "address data appending device," and an LA checking device 5 as a "checking device."

The host communication control device 1A is a circuit for receiving commands and data from the host 3, and transmitting results of processing the commands and so on to the host 3. As shown in the specific example described later, the host communication control device 1A can be provided with, for example, a protocol chip, a Direct Memory Access (DMA) circuit, and a microprocessor.

The device communication control device 1B is a circuit for writing data into the storage apparatus 2 and reading out data from the storage apparatus 2. As shown in the specific example described later, the device communication control device 1B can be provided with, for example, a protocol chip, a DMA circuit, a microprocessor, and a parity generation circuit.

The cache memory 1C is a memory for temporarily storing the data received from the host 3 and the data read out from the storage apparatus 2.

The LA appending device 1D appends an 8 byte security code to every 512 byte logical block. The security code includes at least address data LA obtained from the logical address of the logical block. Although it is possible to include the LRC in the security code besides the LA, the explanations are presented in the present embodiment focusing on the address data LA.

The buffer memory 4 can also be called a "second memory device." The buffer memory 4 is disposed between the cache memory 1C and the device communication control section 1B. The cache memory 1C and the storage apparatus 2 transmit and receive data via the buffer memory 4.

The LA checking device 5 is for executing determination on the data read out from the storage apparatus 2 regarding whether or not the address data LA appended to the data and the logical address (accurately, the logical address the data should be provided with (the expected value of the logical address)) of the data match with each other. In other words, the LA checking device 5 determines whether or not the value of the address data LA actually appended to the data read out and the value of the address data LA expected to be appended to the data match with each other.

As shown in the specific example described later, the LA appending device 1D and the host communication control device 1A can be combined integrally with each other. Similarly, the device communication control device 1B, the buffer memory 4, and the LA checking device 5 can also be combined integrally with each other.

In the present embodiment, the host computer 3 and the storage apparatus 2 handle the data by 512-byte logical block. The storage controller 1 appends 8-byte address data LA to the 512-byte logical block received from the host computer 3. Thus, a logical block with a size of 520 bytes is generated. The 520-byte block appended with the LA is referred to as an extended logical block in the present embodiment. The 512-byte logical block corresponds to a "first block," and the 520-byte extended logical block corresponds to a "second block."

The part (b) of FIG. 1 shows a method of handling the block data. The column (1) in the part (b) of FIG. 1 shows the data divided into the extended logical blocks and stored in the cache memory 1C. Since the size (520 bytes) of the extended logical block to be stored in the cache memory and the size (512 bytes) of the logical block to be stored in the storage apparatus 2 are different from each other, the boundaries of the extended logical blocks and the boundaries of the logical blocks do not match with each other in ordinary cases.

However, in the case in which the size of the data composed of a plurality of extended logical blocks and the size of the data composed of a plurality of logical blocks take the value of the least common multiple (LCM) of the size of the logical block and the size of the extended logical block, the both ends of the data match with each other. Specifically, the both ends of the data composed of 64 extended logical blocks and the both ends of the data composed of 65 logical blocks match with each other.

Therefore, in the present embodiment, it is arranged that 64 extended logical blocks are treated as a bunch of data, and input to or output from the storage apparatus 2. The part (b) of FIG. 1 shows a total of 64 blocks #0 through #63. By thus inputting and outputting the data from and to the storage apparatus 2 based on the least common multiple of the size of the extended logical block and the size of the logical block, it is possible to efficiently read out and write the data.

The column (2) in the part (b) of FIG. 1 shows the data stored in the storage apparatus 2. As described above, since the storage apparatus 2 handles the data by 512-byte logical block, the number of blocks should be 65. However, the data is shown here as data composed of a plurality of extended logical blocks for the sake of convenience of explanations.

The case in which the device communication control device 1B writes the data (the column (1) in the part (b) of FIG. 1), which is composed of 64 extended logical blocks and is stored in the cache memory 1C, in the storage apparatus 2 will be explained. In the following explanations, the data composed of 64 extended logical blocks is referred to as, for example, data of a predetermined number of blocks.

The device communication control device 1B divides the data of the predetermined number of blocks into an anterior part and a posterior part at a divisional position PD1. Thus, the data FA of the anterior part and the data BA of the posterior part are obtained. The divisional position PD1 is generated using a random number or a pseudorandom number, or based on a predetermined divisional position calculation rule so as to vary every time data is written to the storage apparatus 2. As the predetermined divisional position calculation rule, there can be cited, for example, a method of adding or subtracting a predetermined value to or from the previous divisional position to obtain a new divisional position.

The divisional position PD1 is set correspondingly to every data of the predetermined number of blocks. For example, in the case in which three pieces of data of the predetermined number of blocks are written consecutively to the storage apparatus 2, the divisional point PD1 is set correspondingly to each of the three pieces of data of the predetermined number of blocks to divide the data into the anterior and posterior parts.

Further, the divisional position PD1 is set correspondingly to every storage area with a size corresponding to a predetermined number of blocks in the storage apparatus 2. For example, exemplifying the case of the mirroring (RAID1), when certain data is written to the user area, the data is written to both of a main storage apparatus and a sub-storage apparatus. On this occasion, a main divisional position set in the data written to the main storage apparatus and a sub-divisional position set in the data written to the sub-storage apparatus can be the same or different from each other. In the case of another RAID configuration such as RAID5, similarly to the case described above, it is possible to separately provide the divisional positions respectively to the storage apparatuses 2.

Further, the divisional position PD1 can be set at the head (the end of the data of the predetermined number of blocks in a different point of view) of the data of the predetermined number of blocks. On this occasion, the data is written to the storage apparatus 2 in the original order without counterchanging the data in the anterior and posterior parts around the divisional position PD1.

The divisional position PD1 is set in the data of the predetermined number of blocks in a manner as described above. The storage controller 1 stores and manages the divisional position PD1. For example, the divisional position PD1 is stored in a memory in the storage controller 1 or in a specific storage apparatus 2.

As shown in the column (2) in the part (b) of FIG. 1, the device communication control device 1B counterchanges the data FA located in the anterior part to the divisional position PD1 and the data BA located in the posterior part to the divisional position PD1, and transfers the data to the storage apparatus 2 to store the data in the storage apparatus 2.

Therefore, in the example shown in the drawing, the data FA corresponding to the blocks #5 through #63 is disposed in the anterior area to the data BA corresponding to the blocks #0 through #4, and written to the storage apparatus 2. It should be noted that, as described above, the both ends of the data composed of 64 extended logical blocks and the both ends of the data composed of 65 logical blocks match with each other.

As shown in the column (3) in the part (b) of FIG. 1, when reading out the data from the storage apparatus 2, the device communication control device 1B reads out the data FA in the anterior part and the data BA in the posterior part from the storage apparatus 2 based on the divisional position PD1 thus stored, and transfers the data to the cache memory 1C after counterchanging the anterior and posterior positions of the data.

The LA checking device 5 determines whether or not the address data LA included in the extended logical block and the logical address expected for the extended logical block match with each other with respect to the data of each extended logical block.

For example, in an explanation of the extended logical block #5 stored at the head of the storage apparatus 2, the address data appended to this extended logical block represents "#5." The divisional position PD1 is in a range between the extended logical block #4 and the extended logical block #5. By storing the value of the divisional position PD1, the expected value of the logical address of the data read out from the storage apparatus 2 can be calculated based on the divisional position PD1.

For example, the value of the logical address expected for the head extended logical block is #5 (#5=PD1), and the subsequent extended logical block is expected to have the address value of #6 obtained by incrementing #5 by one (#6=#5+1=PD1+1). Then, in a similar manner, the logical addresses expected for the respective extended logical blocks of the data in the posterior part BA can automatically be calculated. Regarding the data in the anterior part FA stored subsequently to the data in the posterior part BA, the values from #0 to #4 corresponding to the position immediately short of the divisional position PD1 are calculated as the expected values of the logical addresses.

If the address data LA provided to the extended logical block read out from the storage apparatus 2 represents #5, and the expected value of the logical address obtained based on the divisional position PD1 is #5, the both values match with each other, and therefore, the LA checking device 5 can determine that the data is read out correctly. Then, in a similar manner, by comparing the expected value of the logical address with the value of the address data LA with respect to each of the extended logical blocks, it is possible to quickly confirm the fact that the desired data is read out.

Even in the case in which the divisional position PD1 managed by the storage controller 1 is lost, it is possible to restore the divisional position PD1 using the technical feature of being capable of calculating the expected value of the logical address of each of the extended logical blocks based on the divisional position PD1. This point will be explained as the specific example described later.

The column (4) in the part (b) of FIG. 1 shows the case of a failure with a clerical error. The failure with a clerical error represents the case in which the data transferred to the storage apparatus 2 fails to be written to the correct storage destination. The failure with a clerical error includes, for example, the case in which the data is lost without being written to any area in the storage apparatus, and the case in which the data is written to an area different from the original storage destination.

The column (4) in the part (b) of FIG. 1 shows the case in which the data is not written correctly, and the previous data remains due to the failure with a clerical error. The previous data is divided at a different divisional position PD2, and the extended logical block #3 is located at the head block.

Under the assumption that the data is divided at a position between the extended blocks #4 and #5, the device communication control device 1B reads out the data from the storage apparatus 2, and then counterchanges the anterior and posterior part to restore the data to the original order. The LA checking device 5 determines whether or not the value of the address data LA of the extended logical block thus read out and the value of the expected logical address match with each other.

In the case of the column (4) in the part (b) of FIG. 1, the expected value of the logical address and the value of the LA do not match with each other. Focusing attention on, for example, the data of the extended logical block stored at the head of the storage apparatus 2, the value of the LA thereof is #3 on the one hand, the expected value of the logical address is #5 on the other hand, thus the both values do not match with each other. Therefore, the LA checking device 5 detects occurrence of an error. Thereafter, with respect to each of the extended logical blocks of the previous data, the expected value of the logical address thereof and the value of the address data LA do not match with each other, likewise.

It should be noted that in the case in which the error is detected, the lost data can be restored by executing so-called correction read. For example, in the case of RAID1, if the error is detected in the main storage apparatus 2, it is possible to read out the correct data from the sub-storage apparatus 2. In the case of the method using a parity such as RAID5, the correct data can be calculated by executing a logic operation using the parity belonging to the same stripe and other data. The correct data is written to the correct area of the storage apparatus 2 in which the error is detected, and stored therein.

As described above, according to the present embodiment, when reading out the data, presence or absence of the error can quickly be detected. According to the present embodiment, the processing time can be reduced and the reliability can be enhanced compared to the configuration of immediately reading out the data, which should have been written to the storage apparatus 2, from the storage apparatus 2 and then checking.

According to the present embodiment, since the error caused when writing can be detected with relative ease when reading out the data, the response performance can be improved without degrading the reliability of the storage controller 1 as a whole even in the case of using the storage apparatus 2 inferior in reliability such as the Serial ATA disk, thus the usability can be enhanced. Hereinafter, the present embodiment will be described in detail.

Figure 2:
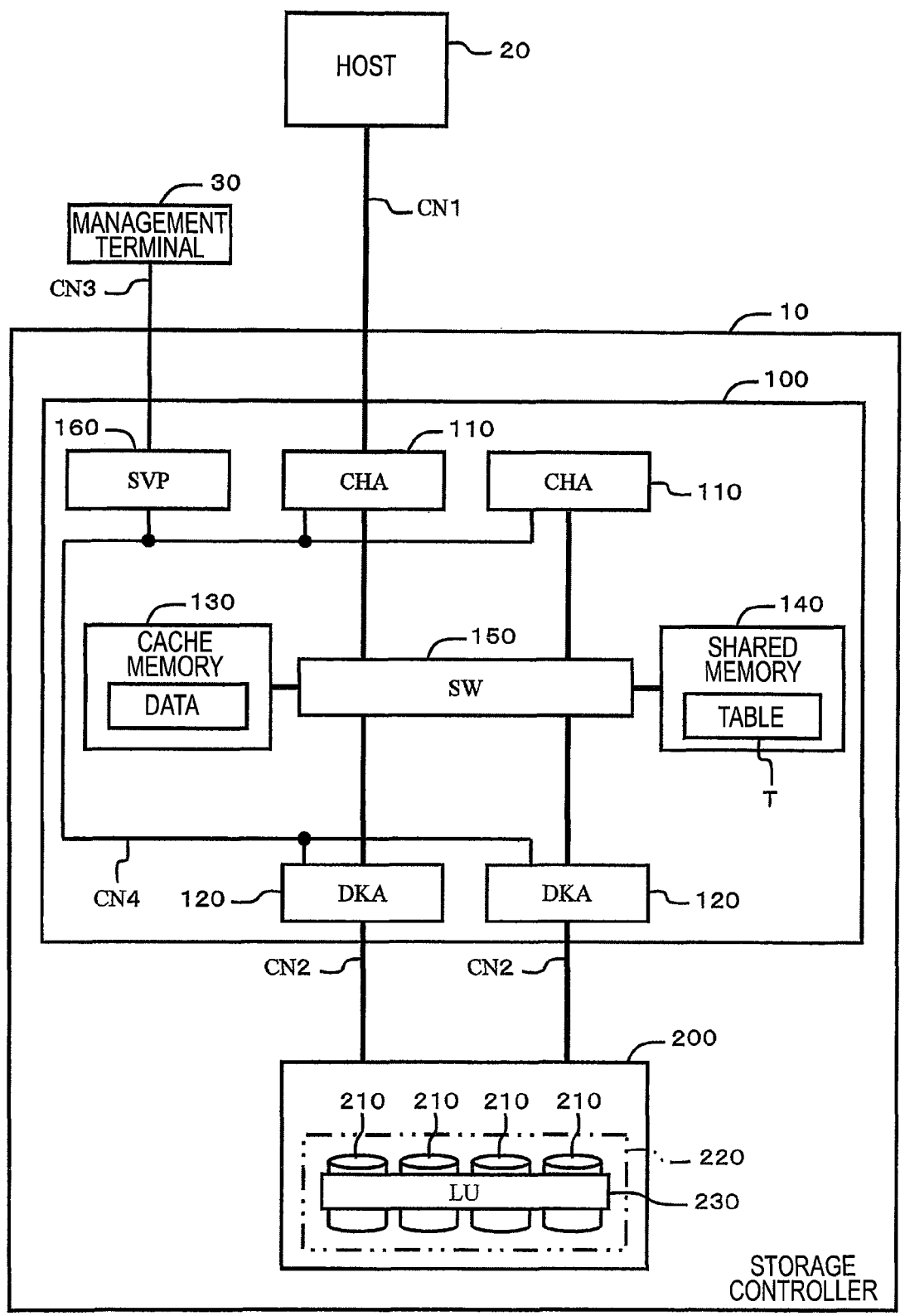
FIG. 2 is a block diagram showing an overall configuration of an information processing system.

FIG. 2 is an explanatory diagram showing an overall configuration of an information processing system including a storage controller 10 according to the present specific example. The information processing system can be configured including at least one storage controller 10, one or more hosts 20, at least one management terminal 30.

The correspondence with the embodiment described with reference to FIG. 1 will be explained. The storage controller 10 corresponds to the storage controller 1, storage apparatuses 210 correspond to the storage apparatus 2 shown in FIG. 1, the host 20 corresponds to the host 3 shown in FIG. 1, a channel adapter 110 corresponds to the host communication control device 1A shown in FIG. 1, a disk adapter 120 corresponds to the device communication device 1B shown in FIG. 1, and a cache memory 130 corresponds to the cache memory 1C shown in FIG. 1.

Figure 3:
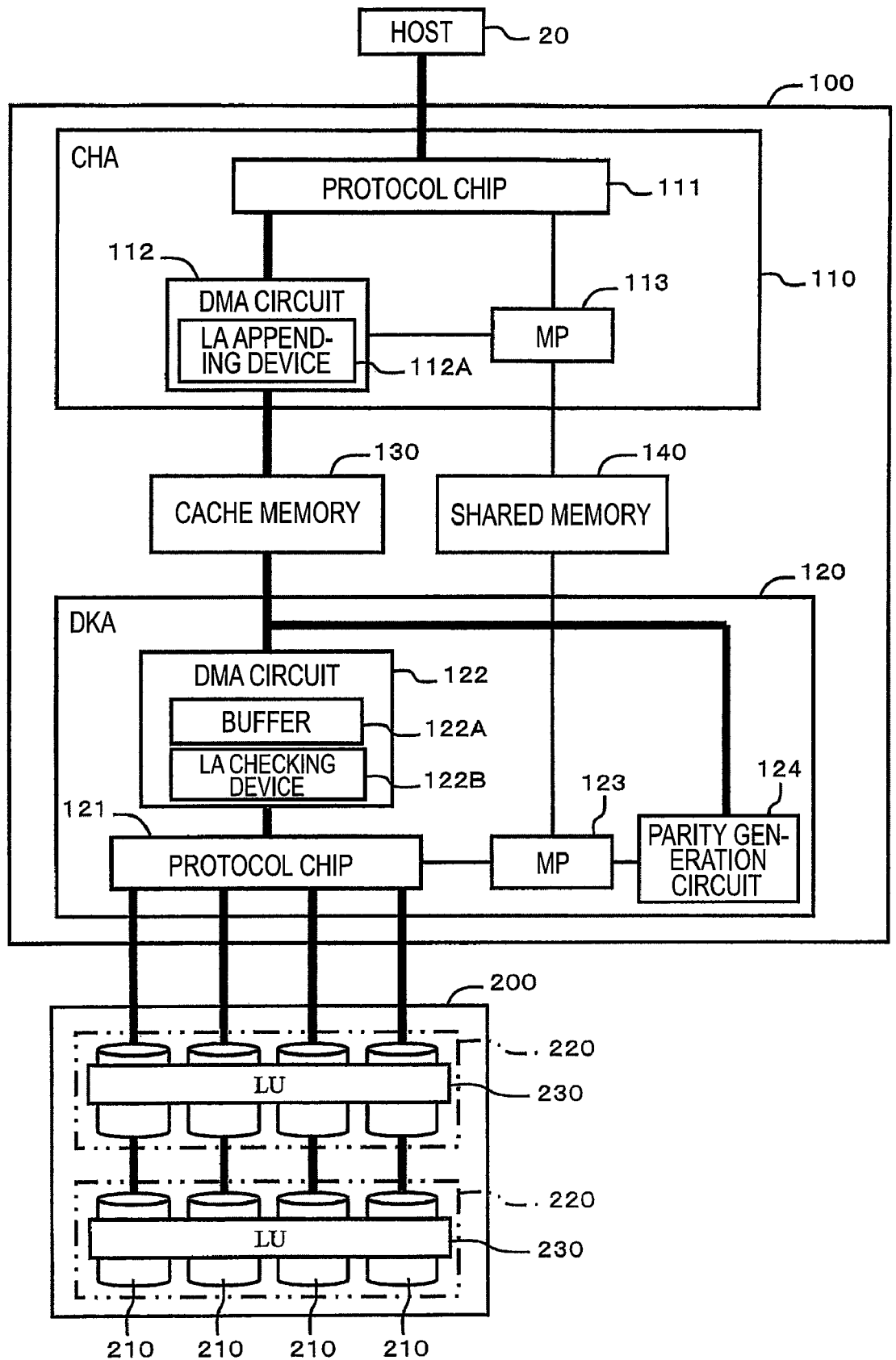
FIG. 3 is a block diagram showing a configuration of a controller.

An LA appending device 112A shown in FIG. 3 corresponds to the LA appending device 1D shown in FIG. 1, an LA checking device 122B shown in FIG. 3 corresponds to the LA checking device 5 shown in FIG. 1, and a buffer memory 122A shown in FIG. 3 corresponds to the buffer memory 4 shown in FIG. 1.

The host 20 and the management terminal 30 will be explained first, and then the storage controller 10 will be explained. The host 20 is configured as a computer such as a personal computer, an engineering workstation, a server computer, or a mainframe computer, and is coupled to the storage controller 10 via a communication network CN1. The communication network CN1 can be configured as a communication network such as Fibre Channel-Storage Area Network (FC-SAN) or Internet Protocol-SAN (IP-SAN).

The host 20 handles data by a logical block of 512 bytes. The host 20 issues a read command and a write command to the storage controller 10, and receives the processing result from the storage controller 10.

The management terminal 30 is coupled to a service processor 160 in the storage controller 10 via a communication network CN3. The communication network CN3 is configured as a communication network such as a Local Area Network (LAN). The management terminal 30 collects various kinds of information in the storage controller 10 via the service processor (hereinafter referred to as SVP) 160. The management terminal 30 can direct various kinds of setting in the storage controller via the SVP 160.

The configuration of the storage controller 10 will be explained. The storage controller 10 can be divided roughly into a controller 100 and a storage apparatus mounting device 200. The controller 100 is configured including, for example, at least one channel adapter (hereinafter referred to as CHA) 110, at least one disk adapter (hereinafter referred to as DKA) 120, at least one cache memory 130, at least one shared memory 140, a coupling device ("SW" in the drawing) 150, and the SVP 160. It should be noted that a configuration including a plurality of controllers 100 coupled to each other via a switch in the storage controller 10 can also be adopted. For example, it is possible to form a cluster with the plurality of controllers 100.

The CHA 110 is for controlling the data communication with the host 20, and can be configured as, for example, a computer apparatus equipped with a microprocessor, a local memory, and so on. Each of the CHAs 110 is provided with at least one communication port.

The DKA 120 is for controlling the data communication with each of the storage apparatuses 210, and can be configured as a computer apparatus equipped with a microprocessor, a local memory, and so on similarly to the CHA 110.

Each of the DKAs 120 and each of the storage apparatuses 210 are coupled to each other via communication paths CN2 compliant to, for example, the fibre channel standard. Each of the DKAs 120 and each of the storage apparatuses 210 perform data transfer by block.

The path for the controller 100 to access each of the storage apparatuses 210 is made redundant. Even in the case in which a failure occurs in either one of the DKAs 120 or either one of the communication paths CN2, the controller 100 can access the storage apparatuses 210 using the other DKA 120 and the other communication path CN2. Similarly, the path between the host 20 and the controller 100 can also be made redundant. The configurations of the CHA 110 and the DKA 120 will be described later in detail with reference to FIG. 3.

Operations of the CHA 110 and the DKA 120 will briefly be explained. When receiving the read command issued by the host 20, the CHA 110 stores the read command in the shared memory 140. The DKA 120 refers to the shared memory 140 as needed, and when finding out the read command to be processed, the DKA 120 reads out the data from the storage apparatus 210 to store the data in the cache memory 130. The CHA 110 reads out the data transferred to the cache memory 130, and transmits the data to the host 20.

On the other hand, when receiving the write command issued by the host 20, the CHA 110 stores the write command in the shared memory 140. Further, the CHA 110 stores the write data thus received in the cache memory 130. After storing the write data in the cache memory 130, the CHA 110 reports completion of write to the host 20. The DKA 120, along the write command stored in the shared memory 140, reads out the data stored in the cache memory 130, and stores the data in predetermined one of the storage apparatuses 210.

The cache memory 130 is for storing user data or the like received from the host 20. The cache memory 130 is composed mainly of, for example, a volatile memory or a nonvolatile memory. The shared memory 140 is composed mainly of, for example, a nonvolatile memory. The shared memory 140 stores various kinds of tables T described later, management information, and so on. The shared memory 140 can also be composed mainly of a volatile memory backed-up with a rechargeable battery or a battery.

The shared memory 140 and the cache memory 130 can be disposed on the same memory substrate in a mixed manner. Alternatively, it is possible to use a part of a memory as a cache area, and another part thereof as a control area.

The coupling device 150 couples each of the CHAs 110, each of the DKAs 120, the cache memory 130, and the shared memory 140 to each other. Thus, all of the CHAs 110 and all of the DKAs 120 can access the cache memory 130 and the shared memory 140 individually. The coupling device 150 can be configured as, for example, a crossbar switch.

The SVP 160 is coupled to each of the CHAs 110 and each of the DKA 120 via an internal network CN4 such as a LAN. Further, the SVP 160 is coupled to the management terminal 30 via the communication network CN3. The SVP 160 collects various kinds of internal states of the storage controller 10, and provides them to the management terminal 30. It should be noted that it is possible to couple the SVP 160 to either one of the CHA 110 and the DKA 120. This is because the SVP 160 is capable of collecting various kinds of status information via the shared memory 140.

The configuration of the controller 100 is not limited to the configuration described above. For example, there can also be adopted a configuration of providing a function of performing data communication with the host 20, a function of performing data communication with the storage apparatuses 210, a function of temporarily storing data, and a function of storing various kinds of tables in a rewritable manner, disposed on one or more control substrates.

The configuration of the storage apparatus mounting device 200 will be explained. The storage apparatus mounting device 200 is provided with a plurality of storage apparatuses 210. Each of the storage apparatuses 210 is configured as, for example, a hard disk device. In some cases, not only the hard disk device, but also a flash memory device, a magneto optical storage apparatus, a holographic memory device, and so on can be used.

Although differing according to the RAID configuration and so on, the parity group 220 is formed of a predetermined number of storage apparatuses 210, such as a pair of storage apparatuses or quad storage apparatuses. The parity group 220 is obtained by virtualizing the physical storage volume provided to each of the storage apparatuses 210 in the parity group 220. It should be noted that in the drawings, the parity groups are described as VDEV for the sake of convenience.

Therefore, the parity group 220 is a virtualized physical storage volume. In the physical storage volume provided to the parity group 220, there can be set one or more logical devices 230. The logical device (a Logical Unit: LU) 230 is provided to the host 20 in conjunction with a Logical Unit Number (LUN).

Although in the present specific example, explanations will be presented exemplifying the hard disk device as the storage apparatus 210, storage apparatuses other than the hard disk device can also be used. Further, for the sake of better understanding, the storage apparatus is described as a "disk" in the flowcharts.

FIG. 3 is a block diagram showing a configuration of the CHA 110 and the DKA 120. The CHA 110 is provided with, for example, a protocol chip 111, a DMA circuit 112, and a microprocessor 113. The protocol chip 111 is a circuit for performing communication with the host 20. The microprocessor 113 controls the overall operation of the CHA 110.

The DMA circuit 112 is a circuit for performing the data transfer between the protocol chip 111 and the cache memory 130 with the Direct Memory Access (DMA) method. The DMA circuit 112 is provided with the LA appending device 112A. The LA appending device 112A sets the address data LA in the logical block received from the host 20 to generate the extended logical block. Further, the LA appending device 112A removes the address data LA from the extended logical block thus read in from the cache memory 130, and thus restoring the logical block.

Similarly to the CHA 110, the DKA 120 is provided with, for example, a protocol chip 121, a DMA circuit 122, and a microprocessor 123. Further, the DKA 120 is also provided with a parity generation circuit 124.

The protocol chip 121 is a circuit for communicating with each of the storage apparatuses 210. The microprocessor 123 controls the overall operation of the DKA 120. The parity generation circuit 124 is a circuit for performing a predetermined logic operation based on the data stored in the cache memory 130 thereby generating parity data.

The DMA circuit 122 is a circuit for performing the data transfer between the storage apparatus 210 and the cache memory 130 with the DMA method. The DMA circuit 122 is provided with the buffer memory (hereinafter also referred to as a buffer) 122A, and executes the DMA transfer via the buffer memory 122A. Specifically, the cache memory 130 and the storage apparatus 210 transmit and receive data via the buffer memory 122A.

The DMA circuit 122 is provided with the LA checking device 122B. The LA checking device 122B compares the value of the logical address expected for the data read out from the storage apparatuses 210 and the value of the address data LA appended to the data, and transfers the data, which is read out from the storage apparatuses 210, to the cache memory 130 only when the both value match with each other.

Figure 4:
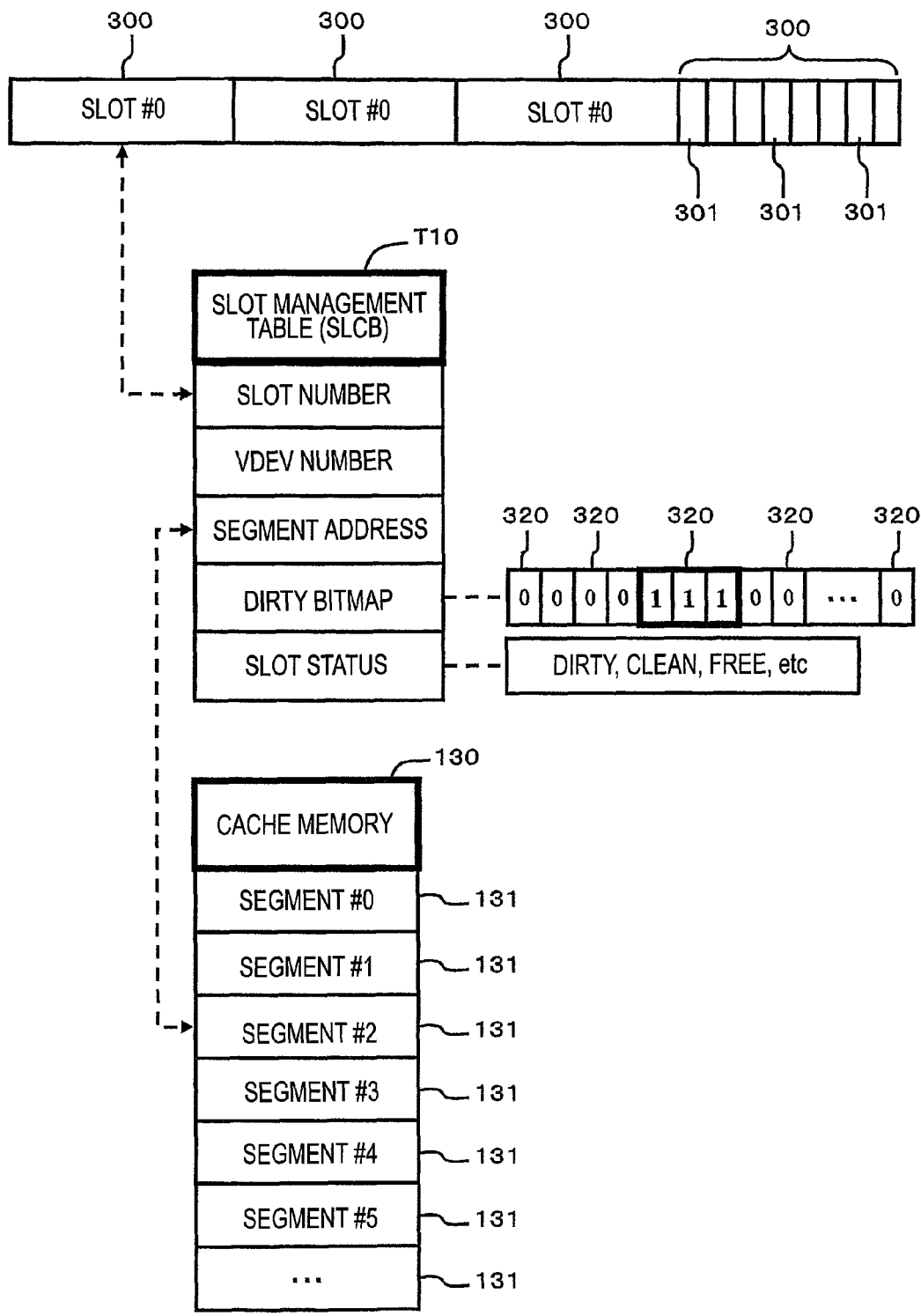
FIG. 4 is an explanatory diagram showing a relationship between a slot and a cache.

FIG. 4 is an explanatory diagram schematically showing a management method of the cache memory 130. As shown in the upper part of FIG. 4, the data transmitted from the host 20 towards the storage controller 10 can be divided into one or more slots.

What is obtained by dividing the data, which is received from the host 20, by a predetermined number of blocks is called a slot 300. Each of the slots is composed of a predetermined number of blocks 301. The size of each of the logical blocks 301 is 512 bytes.

The cache memory 130 is composed of a plurality of segments 131. The size of each of the segments 131 is, for example, 64 KB. The data from the host 20 is stored in the segments 131 assigned to each of the slots.

A slot management table T10 manages the correspondence between the slot 300 and the segment 131 (hereinafter, the slot management table T10 is also referred to as SLCB). The slot management table T10 manages, for example, a slot number, a parity group number, a segment address, a dirty bitmap, and a slot status so as to correspond to each other.

The slot number is identification information for specifying the slot 300 to be the target. The parity group number is identification information for specifying the parity group 220 corresponding to the target slot 300. The segment address is information for identifying the segment assigned to the specified slot. In other words, the segment address represents the storage destination address of the data of the slot. In the case in which no segment is assigned to the slot, the value of the segment address is set to be "0."

The dirty bitmap is update position management information for specifying an update position in the slot 300. One bit is assigned to each of the logical blocks forming the slot. The logical block having been updated is provided with "1," while the logical block not yet updated is provided with "0." Therefore, by referring to the dirty bitmap, it is possible to know which logical block in the slot is the logical block to be updated.

The slot status is information representing the status of the slot. As the status, a dirty state, a clean state, and a free state can be cited. The dirty state denotes the state in which the dirty bitmap includes one or more bits set to be "1." In other words, the dirty state denotes the state of the slot including the logical block to be updated. The clean state represents the state in which the data for update in the slot is written to the storage apparatus 210, and the destage process is completed. The free state represents the state in which the segment assigned to the slot is released so as to able to be assigned to another slot.

By using the slot management table T10, it can easily be managed which area of the cache memory 130 stores the data received from the host 20, whether or not the update data is present, and where the update data is located.

Figure 5:
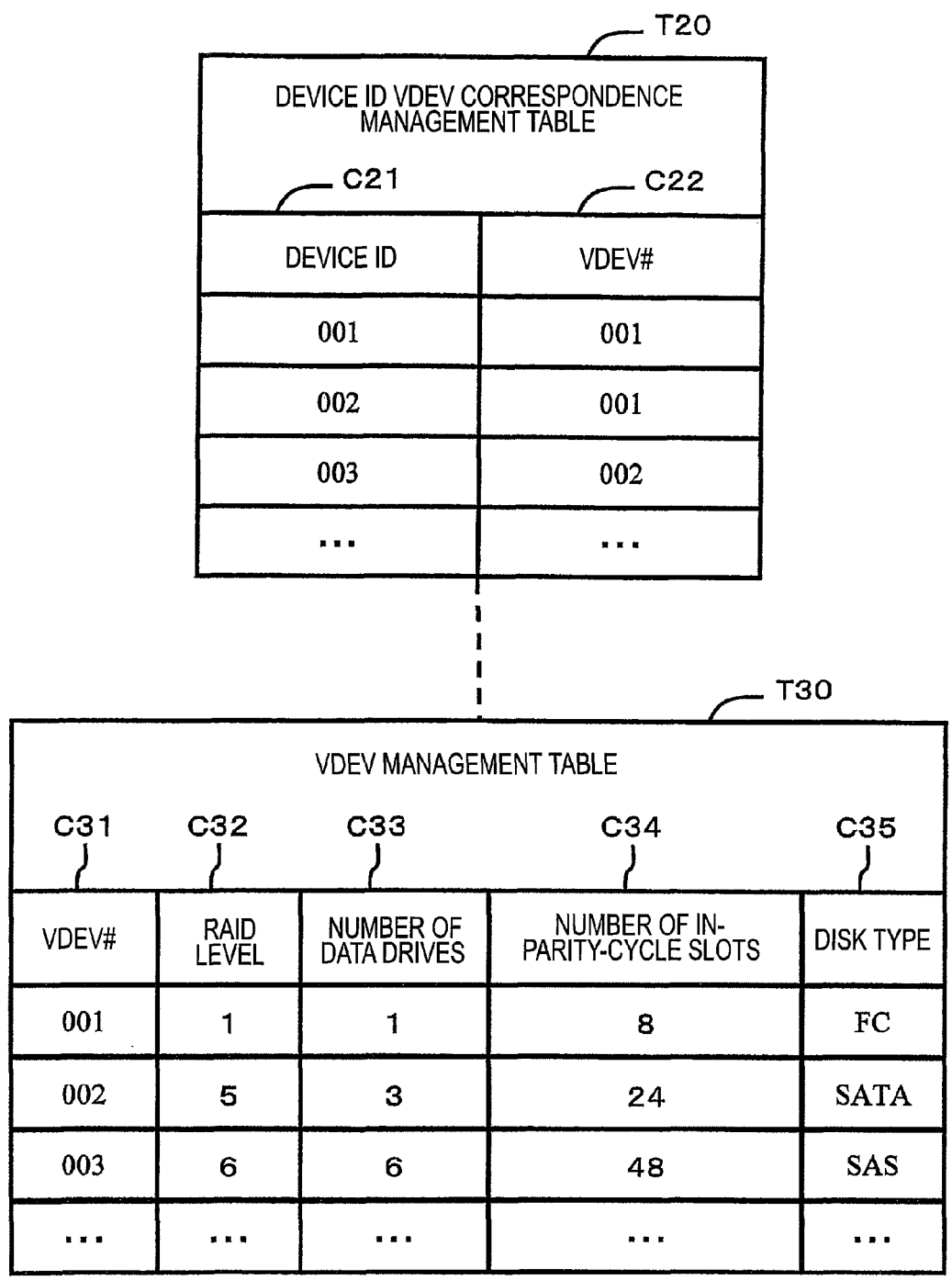
FIG. 5 is an explanatory diagram separately showing a table for managing correspondence between device IDs and parity groups and a table for managing configurations of the parity groups.

FIG. 5 is an explanatory diagram showing a device ID parity group correspondence management table T20, and a parity group management table T30. These tables T20, T30 are stored in the shared memory 140. Each of the CHA 110 and the DKA 120 can copy at least a part of each of the tables T20, T30 to the memory in the CHA 110 or the DKA 120 and uses the at least a part of each of the tables T20, T30 thus copied.

The device ID parity group correspondence management table T20 is a table used for managing the correspondence between the logical devices 230 and the parity groups 220. This table T20 performs the management by providing the correspondence between the device IDs C21 and the parity group number C22. The device ID C21 is information for identifying the logical device 230. The parity group number C22 is information for identifying the parity groups 220.

The parity group management table T30 is a table used for managing the configuration of each of the parity groups 220. The parity group management table T30 provides correspondence between, for example, a parity group number C31, a slot size (not shown), an RAID level C32, the number of data drives C33, the number of in-parity-cycle slots C34, and a disk type C35 to manage them.

The parity group number C31 is information for identifying each of the parity groups 220. The slot size (not shown) represents the number of logical blocks forming the slot corresponding to that parity group 220. The RAID level C32 represents the type of the RAID such as RAID1 through RAID6. The number of data drives C34 represents the number of storage apparatuses for storing data.

The number of in-parity-cycle slots C34 represents the number of slots included in one parity cycle. The disk type C35 represents the type of the storage apparatus 210 forming that parity group 220.

Figure 6:
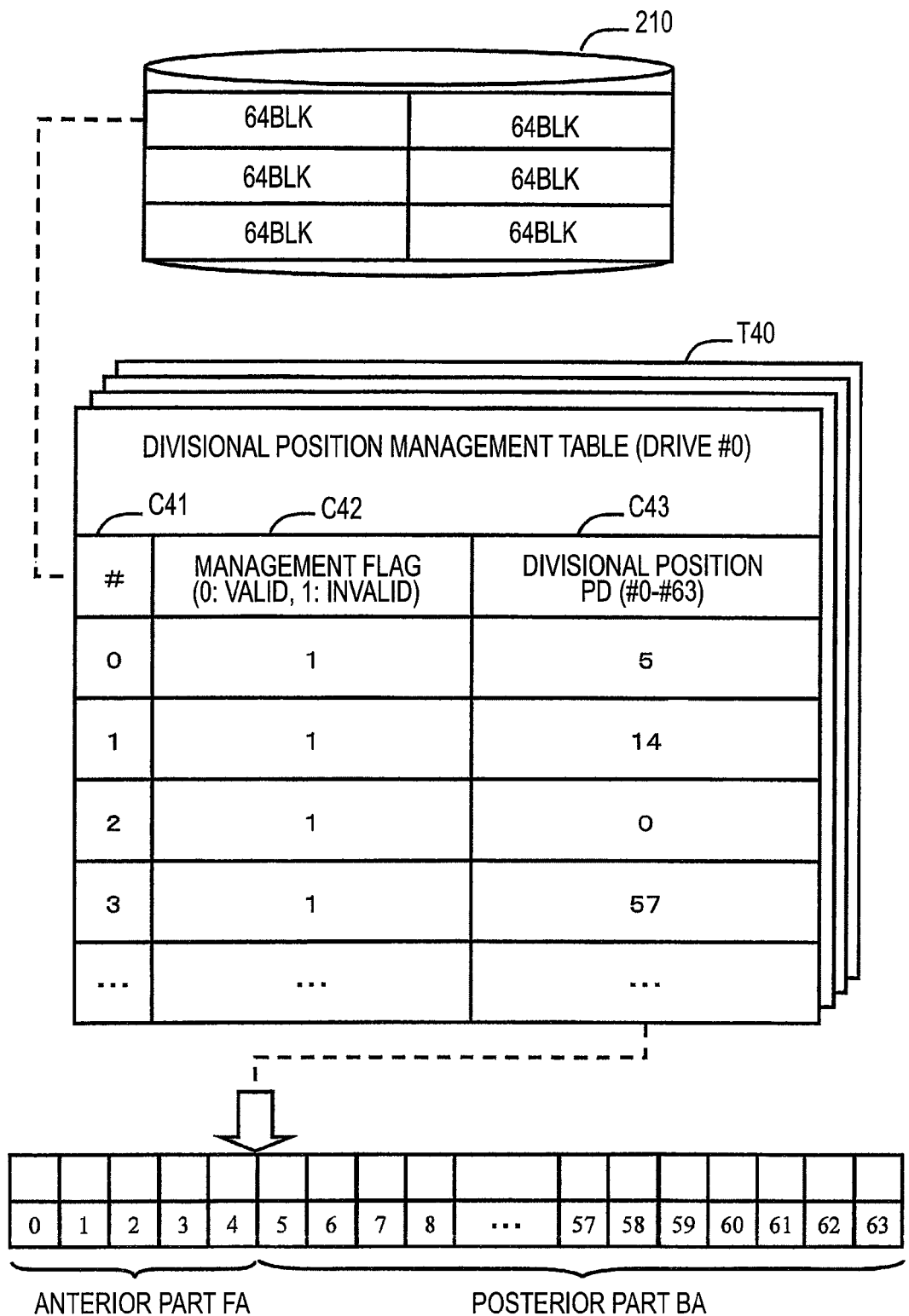
FIG. 6 is an explanatory diagram showing a configuration of a table for managing divisional positions.

FIG. 6 is an explanatory diagram showing a table T40 for managing divisional positions. The divisional position management table T40 can be stored in, for example, a system area in either one of the storage apparatuses 210 or two or more storage apparatuses 210. Alternatively, there can be adopted a configuration of storing the management table T40 in the shared memory 140 or the cache memory 130. The divisional position management table T40 manages, for example, a management number C41, a management flag C42, and a divisional position management field C43, while providing correspondence therebetween.

The management number C41 is information for managing an area (=520×64) with a size of a predetermined number of blocks in each of the storage apparatuses 210. The management flag C42 is information representing whether or not the divisional position PD set in the area with a predetermined number of blocks is valid. If the divisional position PD is valid, "0" is set in the management flag. If the divisional position PD is invalid, "1" is set in the management flag. In the case in which there is a possibility of losing the whole or a part of the content of the management table T40 due to, for example, the power failure, "1" is set in the management flag.

The divisional position management field C43 stores the divisional position PD for dividing the data with the predetermined number of blocks. The divisional position PD is one of the numbers #0 through #63 of the extended logical blocks selected therefrom based on a random number or a predetermined calculating formula or the like. It should be noted that if the divisional position PD is set at the head (or the end) of the data, the data is not divided.

The wider selection range of the divisional position PD can reduce the possibility that the logical address accidentally matches with that of the previous data in the failure with the clerical error, and therefore is more preferable. From the viewpoint of reducing the possibility of the accidental matching as much as possible, it is preferable to use the calculating formula such as adding or subtracting a predetermined value to or from the previous divisional position PD. However, in that case, since the previous divisional position PD needs to be read out from the management table T40, degradation in the processing performance might be caused. In contrast, in the case of determining the divisional position PD using a random number or a pseudorandom number, there is a possibility that the value of the address data LA of the previous data and the logical address expected for the correct data match with each other with a probability of one out of 4096. However, in this case, since there is no need for reading out the previous divisional position PD form the management table T40, the processing performance can be enhanced. In the present specific example, either of the methods can be adopted.

Figure 7:
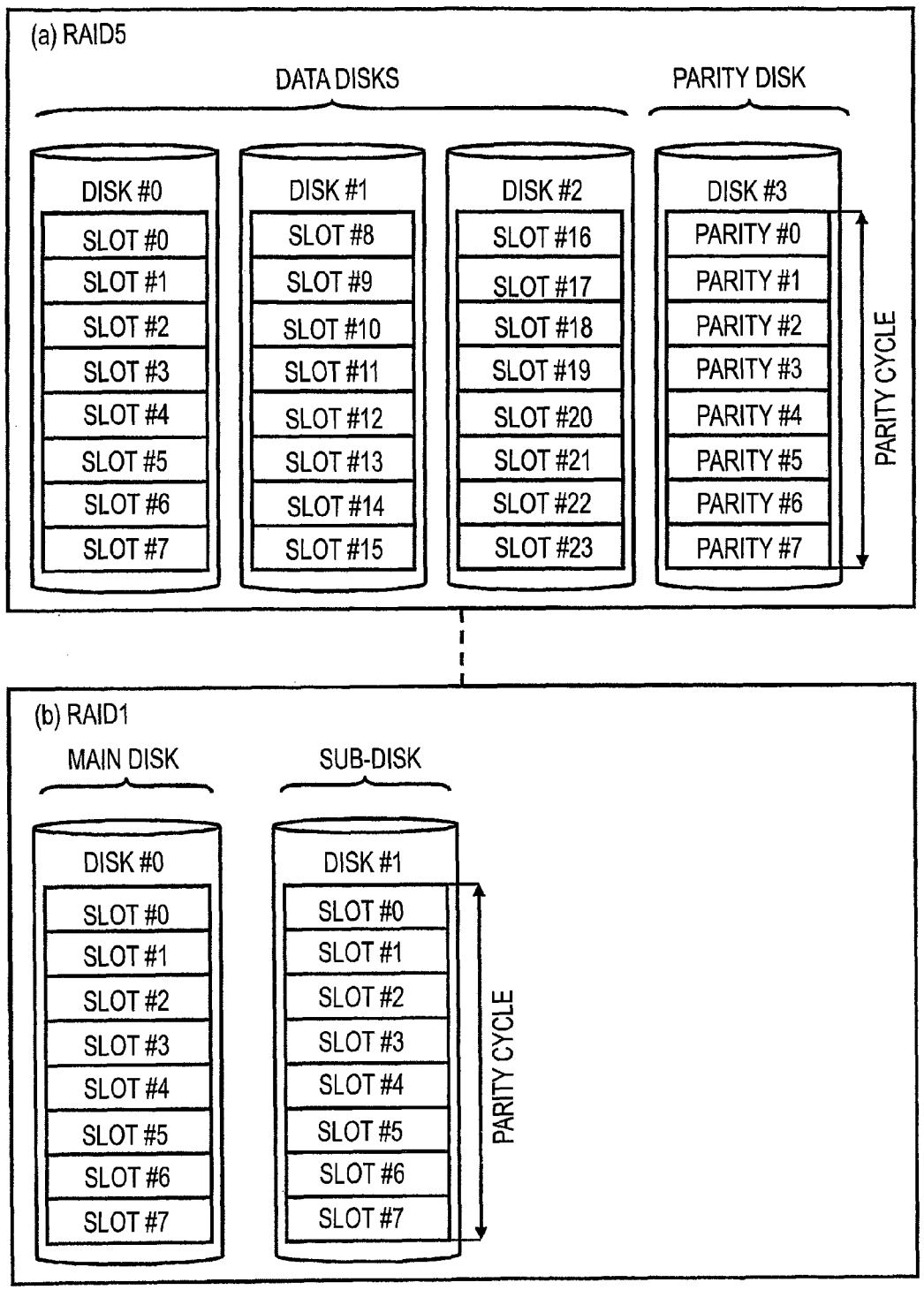
FIG. 7 is an explanatory diagram showing a condition of the slots allocated in storage apparatuses.

FIG. 7 is an explanatory diagram schematically showing the mapping condition between the slots 300 and the storage apparatuses 210. The part (a) of FIG. 7 shows the case of the RAID5, and the part (b) of FIG. 7 shows the case of the RAID1.

The part (a) of FIG. 7 shows the case of forming the RAID5 of 3D+1P with three data disks (#0, #1, and #2) and one parity disk (#3). The data disk (#0) is provided with the slot #0 through slot #7, the data disk (#1) is provided with the slot #8 through slot #15, the data disk (#2) is provided with the slot #16 through slot #23, and the parity disk (#3) on the right is provided with the parity #0 through parity #7. In other words, each of the data disks is provided with eight consecutive slots disposed therein.

The size of the parity corresponding to eight slots (#0 through #7) is called a parity cycle. In the subsequent parity cycle to the parity cycle shown in the drawing, the parities are stored in the disk (#2) located on the left of the disk (#3). In the next parity cycle, the parities are stored in the disk (#1). In the manner described above, the disk for storing the parity data is switched every parity cycle. As is understood from the part (a) of FIG. 7, the number (C34 in the table T30) of slots included in one parity cycle can be obtained by multiplying the number of data disks (i.e., data drives) by 8.

The part (b) of FIG. 7 shows the case of the RAID1. In the RAID1, the same data is stored on both of the main disk and the sub-disk, respectively. In the case of RAID1, the number of slots included in the parity cycle is 8.

As described above, the mapping condition between the slots 300 and the storage apparatuses 210 can be obtained from the RAID level (C32) and the number of data drives (C33). Therefore, the storage destination of the data received from the host 20 can be calculated based on the mapping condition described above.

Figure 8:
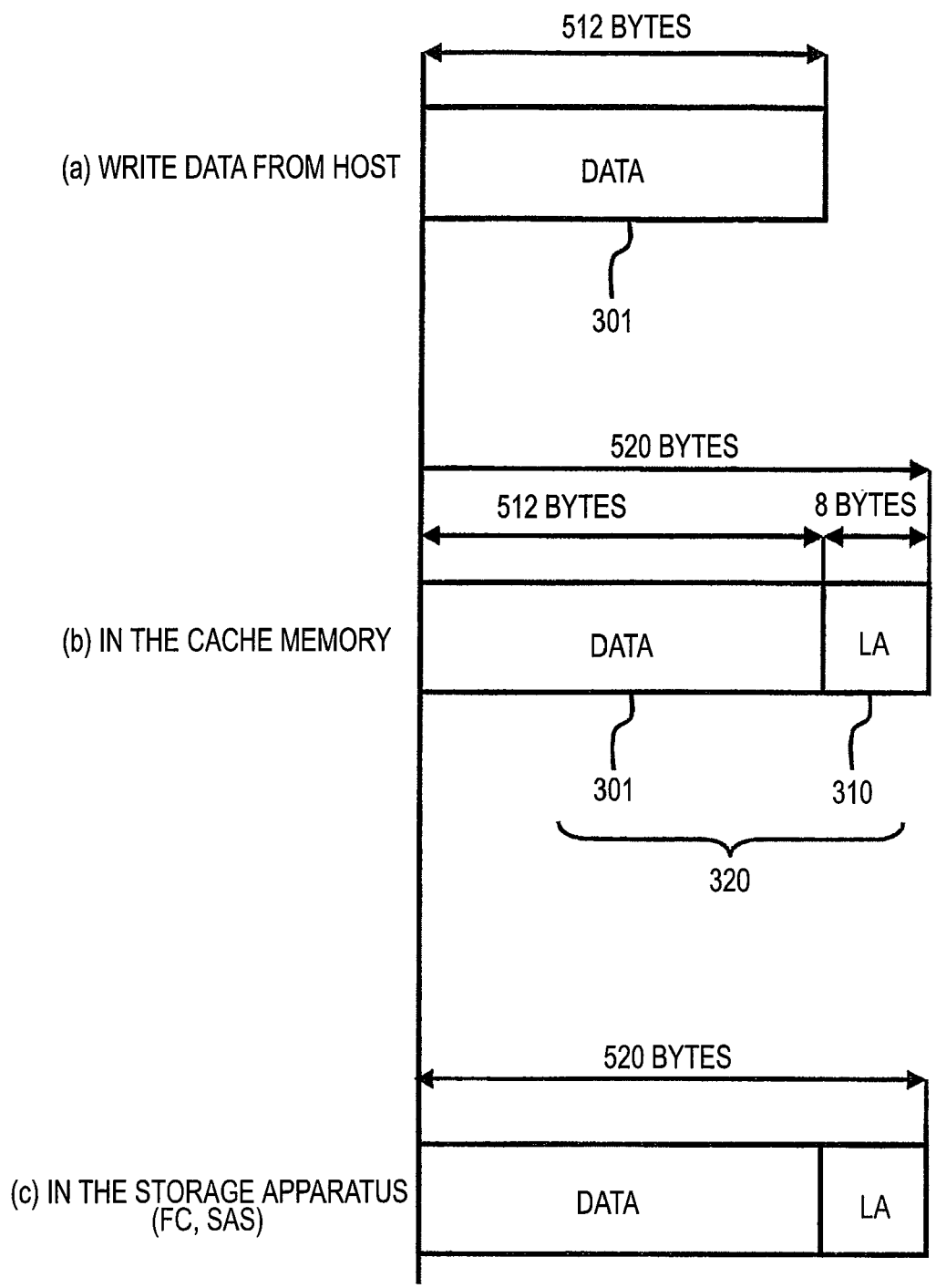
FIG. 8 is an explanatory diagram showing a process of appending a security code to a logical block to generate an extended logical block.

FIG. 8 is an explanatory diagram showing a relationship between the logical block and the extended logical block. As shown in the part (a) of FIG. 8, the logical block 301 has a size of 512 bytes. The host 20 and the storage apparatuses 210 use the logical block 301 as the minimum management unit.

As shown in the part (b) of FIG. 8, the CHA 110 appends the address data 310 of 8 bytes to every logical block 301 with respect to the data received from the host 20. The address data 310 is provided with the value calculated based on the logical address of the logical block 301. It should be noted that although it is possible to make the LRC correspond to the logical block 301 besides the address data, the explanations therefor will be omitted here.

By appending the 8-byte address data LA to the 512-byte logical block 301, the extended logical block 320 is generated. The extended logical block 320 is stored in the cache memory 130. In the case of transmitting the data from the CHA 110 to the host 20, the address data 310 is removed from the extended logical block 320, the data is transmitted to the host 20 as the logical block 301.

As shown in the part (c) of FIG. 8, in the case of the storage apparatuses 210, which can be set to have a format with a unit of 520 bytes, such as an FC disk or an SAS disk, the extended logical block 320 can directly be stored.

Figure 9:
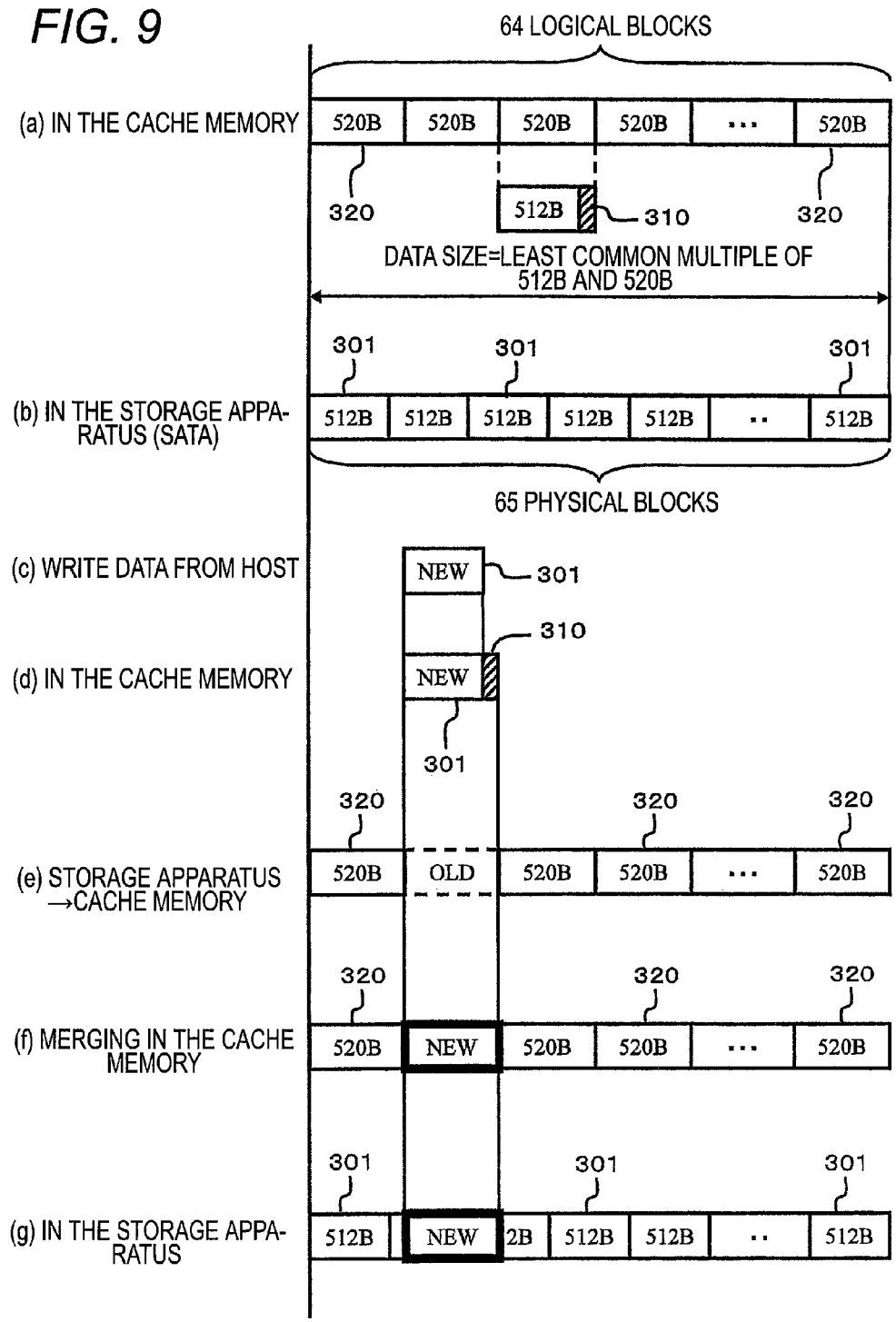
FIG. 9 is an explanatory diagram showing a process of updating the data stored in the storage apparatus based on the least common multiple of the size of the logical block and the size of the extended logical block.

FIG. 9 is an explanatory diagram schematically showing the process of storing the data of the extended logical block 320 in a disk with a sector length fixed to be 512 bytes such as the Serial ATA disk.

As shown in the part (a) of FIG. 9, the data received from the host 20 is appended with the address data 310 in every logical block 301, thus forming the extended logical block 320. The data converted into the format with the extended logical block is stored in the cache memory 130.

As shown in the part (b) of FIG. 9, the storage apparatuses 210 such as the Serial ATA disk drive read and write data by 512 bytes. Therefore, it is not achievable to write the 520-byte extended logical block 320 directly in the storage apparatus.

Therefore, the least common multiple (33280 bytes) of the size (512 bytes) of the logical block 301 and the size (520 bytes) of the extended logical block 320 is used as the data inputting/outputting size for the storage apparatus. The total size (=64×520) of 64 extended logical blocks 320 matches with the total size (=65×512) of 65 logical blocks 301. Therefore, using 64 extended logical blocks 320 as a bunch of data, writing to the storage apparatus 210 and reading from the storage apparatus can be performed. As described above, in the present specific example, the size based on the least common multiple is called the data size of a predetermined number of blocks.

Assuming the above, a read-modify-write process using the data access by a unit of the least common multiple will be explained. As shown in the part (c) of FIG. 9, when receiving the logical block (NEW) including the update data from the host 20, the CHA 110 appends the address data 310 to the logical block 301 of the update data to generate the expanded logical block 320 as shown in the part (d) of FIG. 9. Hereinafter, the block to be updated may be called an update block in some cases.

As shown in the part (e) of FIG. 9, DKA 120 reads out the previous data (OLD) from the storage apparatus 210, and stores the previous data in the cache memory 130. As described above, the data composed of 65 logical blocks is the same as the data composed of 64 extended logical blocks. Therefore, the DKA 120 can obtain the data corresponding to 64 extended logical blocks by reading 65 consecutive logical blocks from the storage apparatus 210. It should be noted that when reading the data, an inspection of comparing the value of the address data and the expected value of the logical address is executed as described later.

As shown in the part (f) of FIG. 9, the extended logical block 320 to be updated is provided with the new data in the cache memory 130. Subsequently, as shown in the part (g) of FIG. 9, the 64 extended logical blocks 320 storing the new data is written to the storage apparatus 210 as 65 logical blocks 301. It should be noted that when writing the data, as described later, the divisional position PD is newly determined, and the data in the anterior part to the divisional position PD and the data in the posterior part to the divisional position PD are counterchanged, and then written to the storage apparatus 210.

In the case of the RAID1, the logical block 320 to which the previous data is written is simply replaced with the logical block 320 storing the new data. In the case of using the parity, as is the case with the RAID5, a new parity is generated from the previous data, the new data, and the previous parity. The new parity is written to the storage apparatus 210 by 64 extended logical blocks in a similar manner to the data. When writing the new parity, the parity data is divided at the divisional position PD, and is written to the storage apparatus 210 after the anterior part and the posterior part thereof are counterchanged. The divisional position PD can be made different between the parities and the data. Alternatively, it is possible to adopt a configuration of making the divisional positions of the parities and the data the same as each other.

The operation of the present specific example will be explained based on FIGS. 10 through 22. The flowchart described below represents a substantial part of the process, and might be different from the actual computer program in some cases. So-called skilled person in the art could counterchange, modify, or eliminate the steps shown in the drawings, or add some new steps thereto.

Figure 10:
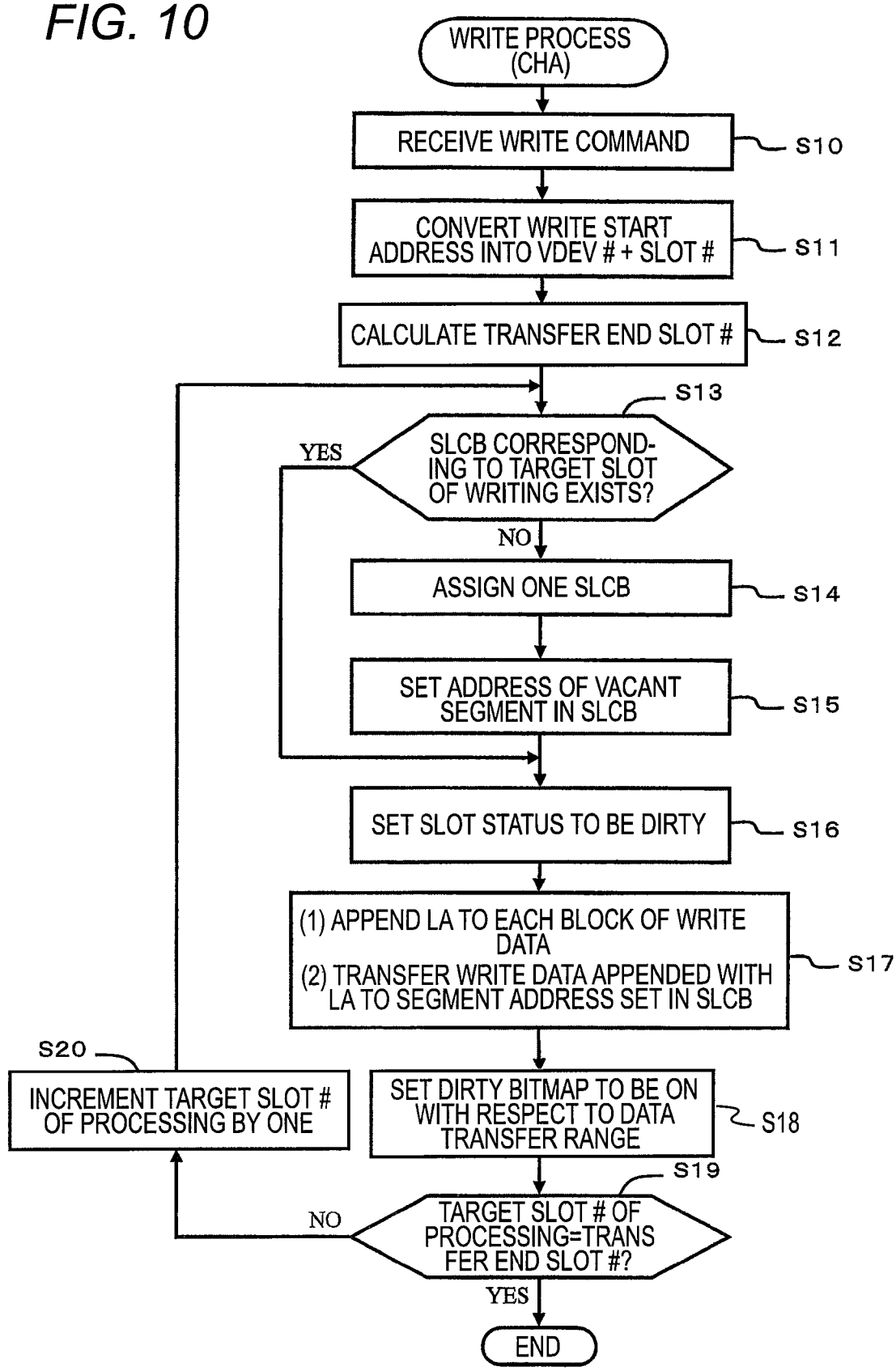
FIG. 10 is a flowchart showing a write process.

FIG. 10 shows a flowchart representing a process of a write command. The CHA 110 executes this process.

When receiving the write command from the host 20 (S10), the CHA 110 converts the write start address into a combination of the parity group number and the slot number (S11). The write command designates the logical device ID, the write start address, and the write size. Therefore, the CHA 110 refers to the device ID parity group correspondence management table T20 based on the device ID thus designated, thereby specifying the parity group number of the write destination. Further, the CHA 110 can detect the slot number of the write destination by referring to the parity group management table T30 based on the parity group number thus designated.

The CHA 110 calculates the transfer end slot number (S12). The transfer end slot number denotes the end slot number of the write data. The CHA 110 can obtain the end slot number of the write data by dividing the value, which is obtained by adding the write size to the write start address, by the slot size.

The CHA 110 determines whether or not the SLCB corresponding to the target slot of writing has already existed (S13). In other words, the CHA 110 determines whether or not the segment 131 of the cache memory 130 is assigned to the target slot of writing (S13).

If the SLCB has not been assigned yet to the target slot of writing (NO in S13), the CHA 110 assigns one SLCB to the target slot of writing (S14). The CHA 110 sets the address of a vacant segment 131 in the SLCB thus assigned (S15). Thus, the target slot of writing and the segment are made to correspond to each other, thus the preparation for storing the data of the target slot of writing in the cache memory 130 is completed.

If the SLCB has already been assigned to the target slot of writing (YES in S13), the steps S14 and S15 are skipped, and the process proceeds to the step S16.

The CHA 110 set the slot status of the target slot of writing to be the dirty state prior to receiving the write data (S16). Subsequently, the CHA 110 transfers the write data (the data of the target slot of writing) received from the host 20 to the segment address assigned to the target slot of writing (S17). Thus, the write data received from the host 20 is stored in a predetermined segment in the cache memory 130.

It should be noted that on the occasion when transferring the write data received from the host 20 to the predetermined segment in the cache memory 130 to store the write data therein, the address data 310 is appended to the write data in every logical block 301 (S17). Therefore, the write data is stored in the cache memory 130 with the format of the extended logical block 320.

The CHA 110 sets the dirty bitmap to be the ON state ("1") with respect to the logical block 301 updated with the write data (S18). Thus, it becomes possible to manage the location of the logical block 301, in which the update data is stored, in the target slot of writing.

The CHA 110 determines whether or not the number of the target slot of the present processing matches with the transfer end slot number obtained in the step S12 (S19). If the number of the target slot of processing and the transfer end slot number do not match with each other (NO in S19), the CHA 110 increments the number of the target slot of processing by one (S20), and the process returns to the step S13. If the both slot numbers match with each other (YES in S19), the present process is terminated.

In the case in which the host 20 writes the write data with a plurality of contiguous slots, namely in the case in which the host 20 performs sequential write, the steps S13 through S19 are repeatedly executed in accordance with the number of slots. In the case in which the host 20 attempts to update one or more logical blocks 301 in one slot, each of the steps S13 through S19 is executed once.

The destage process will be explained based on FIG. 11. The destage process denotes a process of writing the data in the cache memory 130 to the storage apparatus 210. The DKA 120 executes the destage process.

In the destage process, the previous data in the target slot of updating is read out, the update data received from the host 20 and the previous data are merged with each other, and the data thus merged is written to the storage apparatus 210. It should be noted that in the case in which all of the blocks of the target slot of updating is to be updated, there is no need for reading out the previous data from the storage apparatus 210. Here, the explanations will be presented exemplifying the case in which some of the blocks in the slot are updated.

The DKA 120 accesses the SLCB in the shared memory 140 to check whether or not there exists the SLCB with the slot status set to be the dirty state. If the DKA 120 detects the SLCB with the slot status set to the dirty state (S30), the DKA 120 obtains the slot number and the parity group number from the SLCB (S31).

The DKA 120 refers to the parity group management table T30 based on the parity group number, thereby obtaining the disk type of the parity group. The DKA 120 determines whether or not the disk type is either one of the FC disk and the SAS disk (S32) If the disk type is neither the SAS disk nor the FC disk (NO in S32), the size of the extended logical block 320 in the cache memory 130 and the size of the logical block 301 in the storage apparatus 210 do not match with each other. Therefore, the DKA 120 performs a boundary correction process in order for making the boundary of the previous data read out from the storage apparatus 210 match with the boundary of the extended logical block 320 in the cache memory 130 (S33). The details of the boundary correction process will be described later with reference to FIG. 12.

The DKA 120 executes the destage process on both of the main disk (main storage apparatus) and the sub-disk (sub-storage apparatus) after the boundary correction process is terminated (S34). In the destage process, the data is written to the storage apparatus 210 from the cache memory 130 via the buffer memory 122A. The details of the destage process (S34) will be described later with reference to FIG. 14.

Incidentally, in the case in which the disk type is either one of the SAS disk and the FC disk (YES in S32), the DKA 120 executes the destage process for the SAS disk or the destage process for the FC disk accordingly (S35). As described with reference to FIG. 7, in the SAS disk and the FC disk, the sector length can be set to be 520 bytes.

Therefore, the size of the extended logical block 320 as the data management unit in the cache memory 130 and the data input and output unit of the FC disk 210 match with each other. Therefore, the data can be transferred between the FC disk and the cache memory 130 without executing the boundary correction process. Therefore, further explanation of the destage process for the FC disk will be omitted. Since the case with the SAS disk is substantially the same as the case with the FC disk, the explanation thereof will be omitted.

Figure 11:
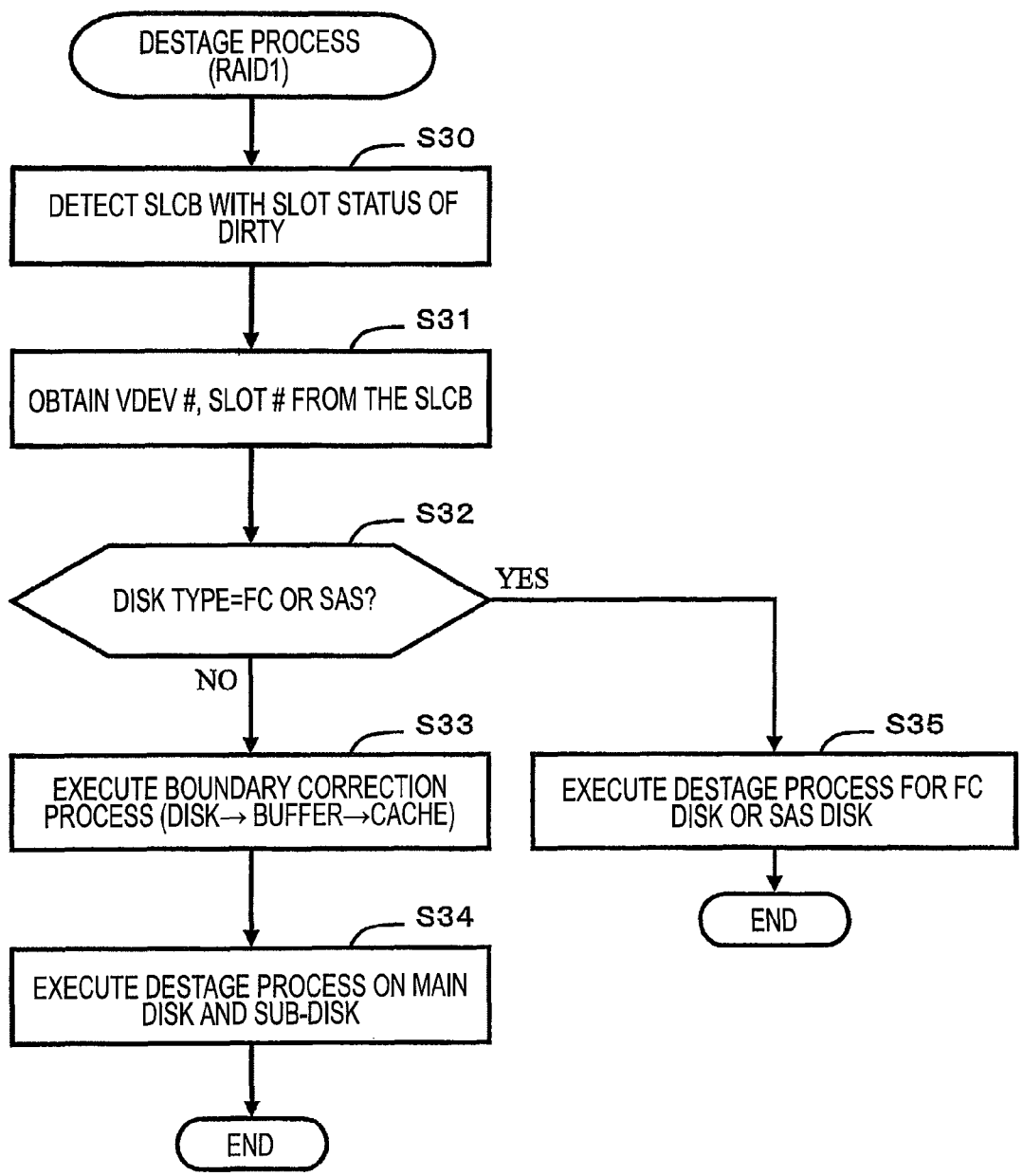
FIG. 11 is a flowchart showing a destage process in the case of RAID1.
Figure 12:
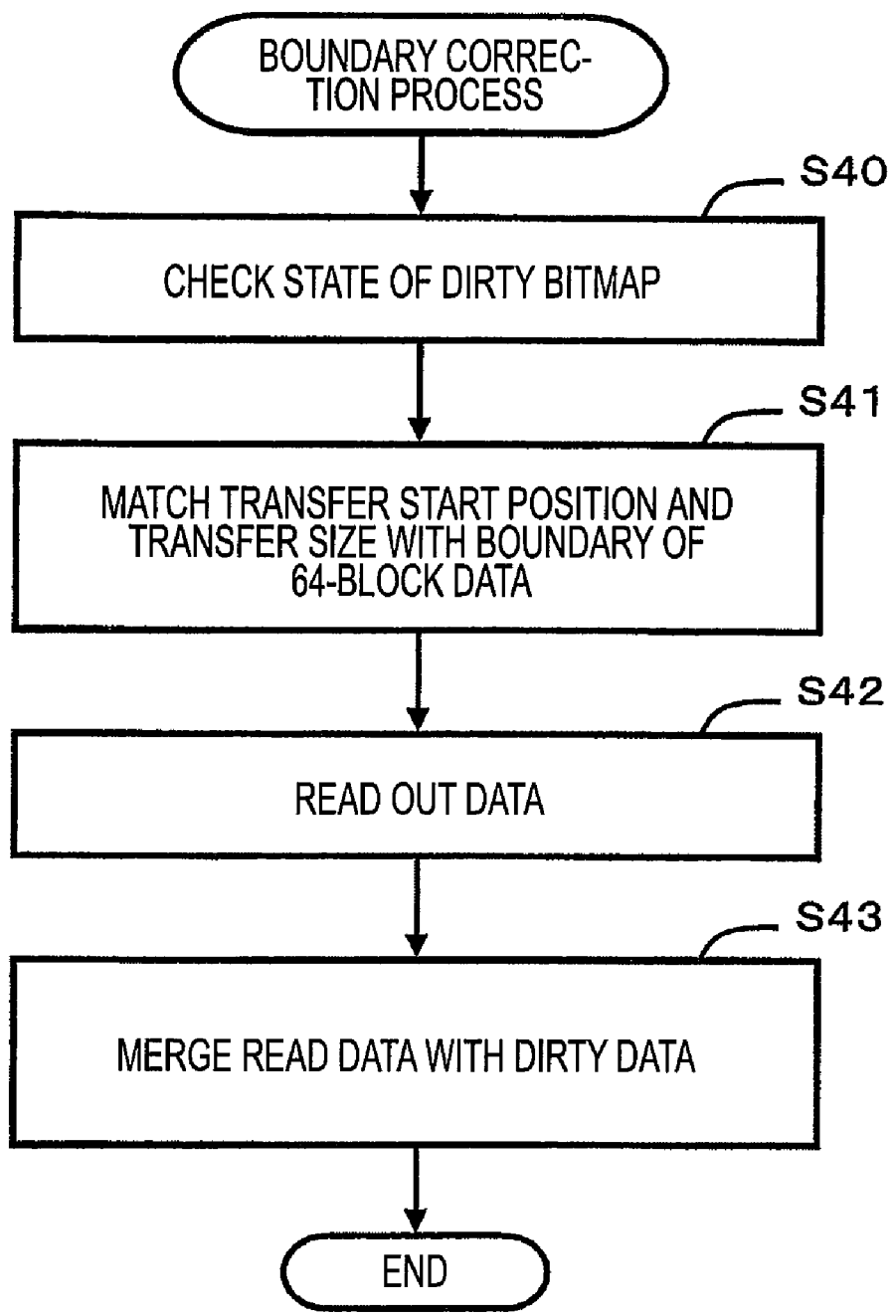
FIG. 12 is a flowchart showing details of step S33 shown in FIG. 11.

FIG. 12 is a flowchart showing the details of the boundary correction process mentioned in the step S33 of FIG. 11. In the boundary correction process, the boundary of the data is corrected on the occasion when transferring the data from the storage apparatus 210 to the cache memory 130.

The DKA 120 refers to the SLCB of the target slot of transferring to check the state of the dirty bitmap set in the SLCB (S40). The DKA 120, with respect to the data (the data in the dirty state) to be the target of the boundary correction, matches the transfer start position and the transfer size thereof with the data size of 64 extended logical blocks (S41). The DKA 120 reads out the previous data from the storage apparatus 210 (S42), and merges the previous data and the new data with each other (S43).

Figure 13:
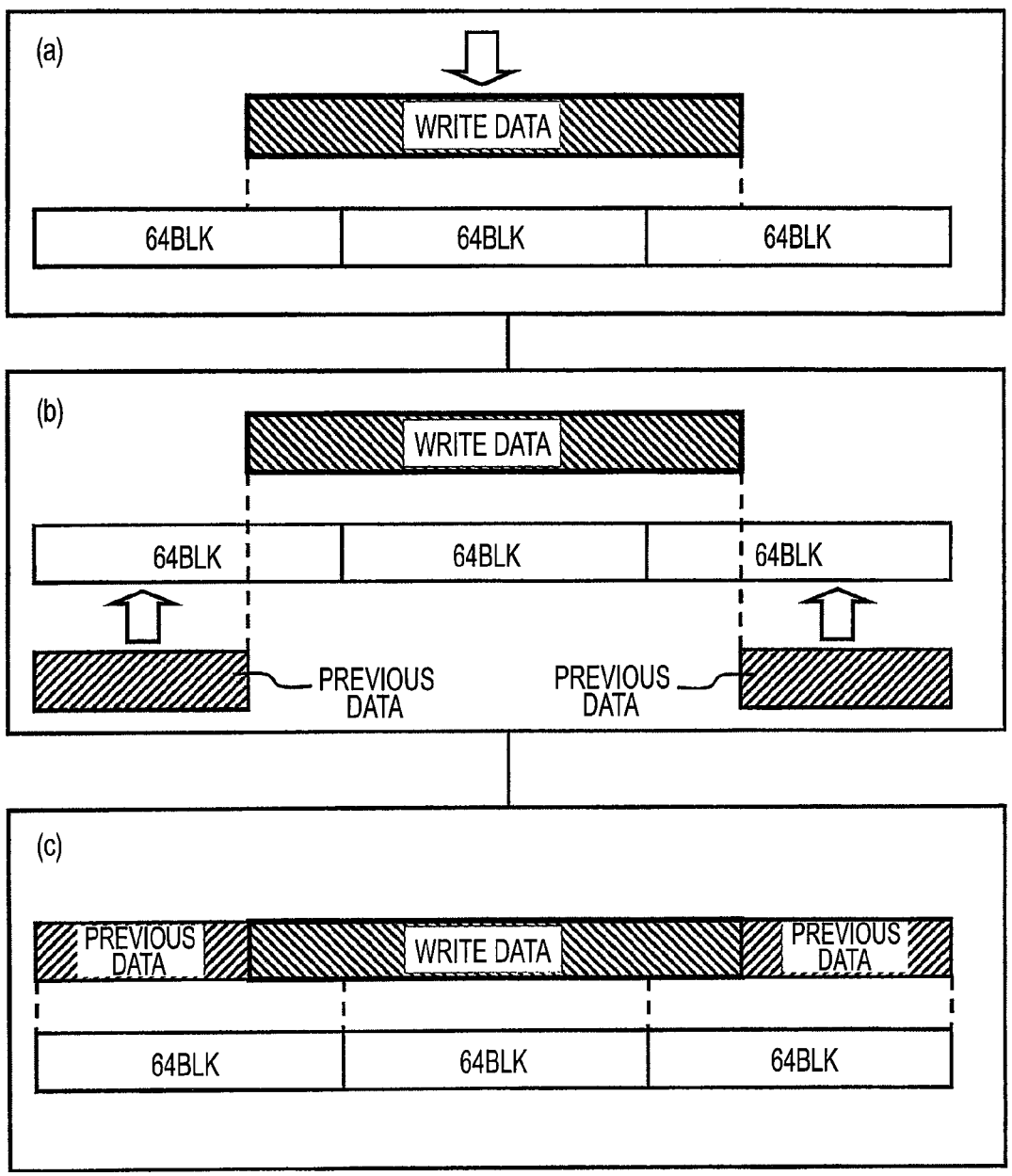
FIG. 13 is an explanatory diagram showing a process of matching the both ends of the data to be written to the storage apparatus with boundaries of the logical blocks by writing the data with the size corresponding to 64 extended logical blocks.

FIG. 13 is an explanatory diagram showing the process of writing the data while matching the both ends of the data with the size of a predetermined number of blocks. In the example shown in the part (a) of FIG. 13, the write data is written to the area straddling a predetermined number (e.g., three) of blocks. In the explanations below, the data corresponding to 64 extended logical blocks is called CHUNK in some cases.

As shown in the part (b) of FIG. 13, the DKA 120 reads out the previous data from the storage apparatus 210 in order for matching the boundaries. The range in the storage apparatus from which the previous data is read out corresponds to the range from the head block of the head CHUNK to the end block of the third CHUNK. Further, when reading the previous data, checking of the LA value based on the divisional position PD is executed on every CHUNK as shown in the case of read process described later. Further, as shown in the part (c) of FIG. 13, the DKA 120 merges the write data with the previous data to generate the data three times as large as the size of the 64 extended logical blocks, and writes the data in the storage apparatus 210.

Figure 14:
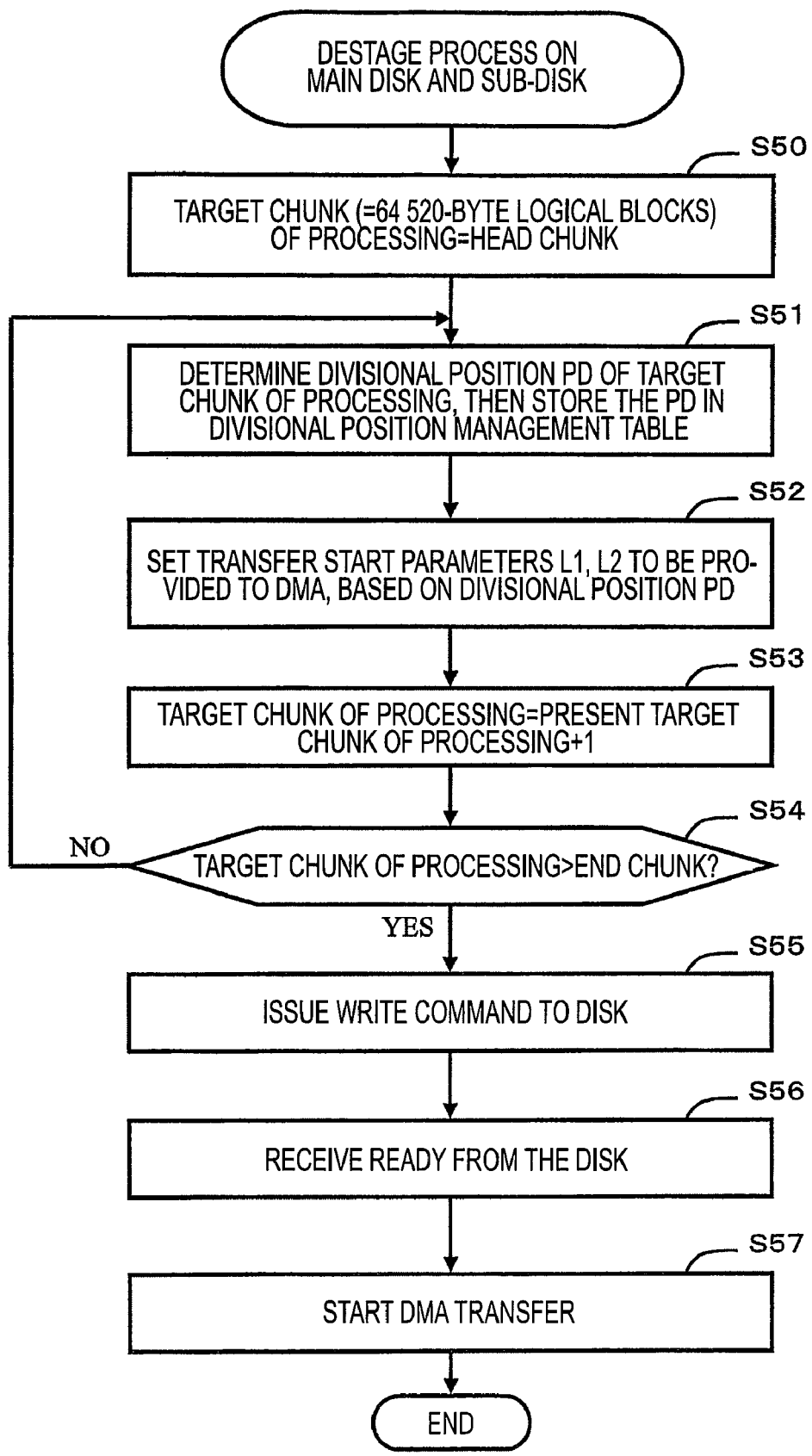
FIG. 14 is a flowchart showing details of step S34 shown in FIG. 11.

FIG. 14 is a flowchart showing the details of the destage process mentioned in the step S34 of FIG. 11. The process is executed on each of the main storage apparatus and the sub-storage apparatus. In the present process, the explanations will be presented exemplifying the case of writing a plurality of data each corresponding to 64 extended logical blocks (one CHUNK of data). It should be noted that with respect to transfer start parameters L1, L2, and so on described later, an explanatory diameter shown in FIG. 15 will be referred to if necessary.

The DKA 120 sets the head CHUNK as the target CHUNK of processing (S50). As shown in the upper part of FIG. 15, the DKA 120 determines the divisional position PD for dividing the target CHUNK of processing, and registers the divisional position PD thus determined in the management table T40 (S51) The data in the anterior part to the divisional position PD is referred to as data in the anterior part FA, and the data in the posterior part to the divisional position PD is referred to as data in the posterior part BA. In the example shown in FIG. 15, the data corresponding to a total of 5 extended logical blocks #0 through #4 forms the data in the anterior part FA, and the data corresponding to a total of 59 extended logical blocks #5 through #63 forms the data in the posterior part BA.

The DKA 120 sets the transfer start parameters L1, L2 to be provided to the DMA circuit 122 based on the divisional position PD (S52). The transfer start parameters denote the parameters necessary for the DMA circuit to execute data transfer.

One of the transfer start parameters L1 is a parameter for allowing the DMA circuit 122 to transfer the data in the posterior part BA. The other of the transfer start parameters L2 is a parameter for allowing the DMA circuit 122 to transfer the data in the anterior part FA.

In the present specific example, the data in the anterior part FA and the data in the posterior part BA are counterchanged with each other, and written to the storage apparatus 210 so that the data in the posterior part BA is located in the front side and the data in the anterior part FA is located in the rear side. Therefore, the parameter for transferring the data in the posterior part BA is set as the transfer start parameter L1 input first to the DMA circuit 122. The parameter for transferring the data in the anterior part FA is set as the transfer start parameter L2 input next to the DMA circuit 122.

In the transfer start parameter L1 for transferring the data in the posterior part BA, the transfer start address is obtained by adding the value, which is obtained by multiplying the divisional position PD by the extended logical block size of 520 bytes, to the head cache address (the address in the cache memory 130) SA of the target CHUNK of processing (i.e., the transfer start address=SA+520×PD). Further, in the transfer start parameter L1, the value obtained by multiplying the value, which is obtained by subtracting the value of the divisional position PD from the total number of blocks (=64) of one CHUNK, by 520 bytes is set as the transfer size (i.e., the transfer size=(64−PD)×520).

In the transfer start parameter L2 for transferring the data in the anterior part FA, the head cache address SA of the target CHUNK of processing is set as the transfer start address (i.e., the transfer start address=SA). Further, in the transfer start parameter L2, the value obtained by multiplying the divisional position PD by 520 bytes is set as the transfer size (i.e., the transfer size=520×PD).

Going back to FIG. 14, after setting of the transfer start parameters L1, L2 for one CHUNK is completed (S52), the DKA 120 increments the target CHUNK of processing by one (S53). The DKA 120 determines whether or not the transfer start parameters L1, L2 are set with respect to all of the CHUNK to be written to the storage apparatus 210 (S54). If there is a CHUNK in which the transfer start parameters L1, L2 have not yet been set (NO in S54), the DKA 120 repeats the steps S51 through S53.

After setting the transfer start parameters L1, L2 in all of the CHUNK (YES in S54), the DKA 120 issues a write command to the storage apparatus 210 (S55). When receiving the notification of ready for writing from the storage apparatus 210 (S56), the DKA 120 inputs each of the transfer start parameters L1, L2 in the DMA circuit 122 to start the DMA transfer (S57).

Figure 15:
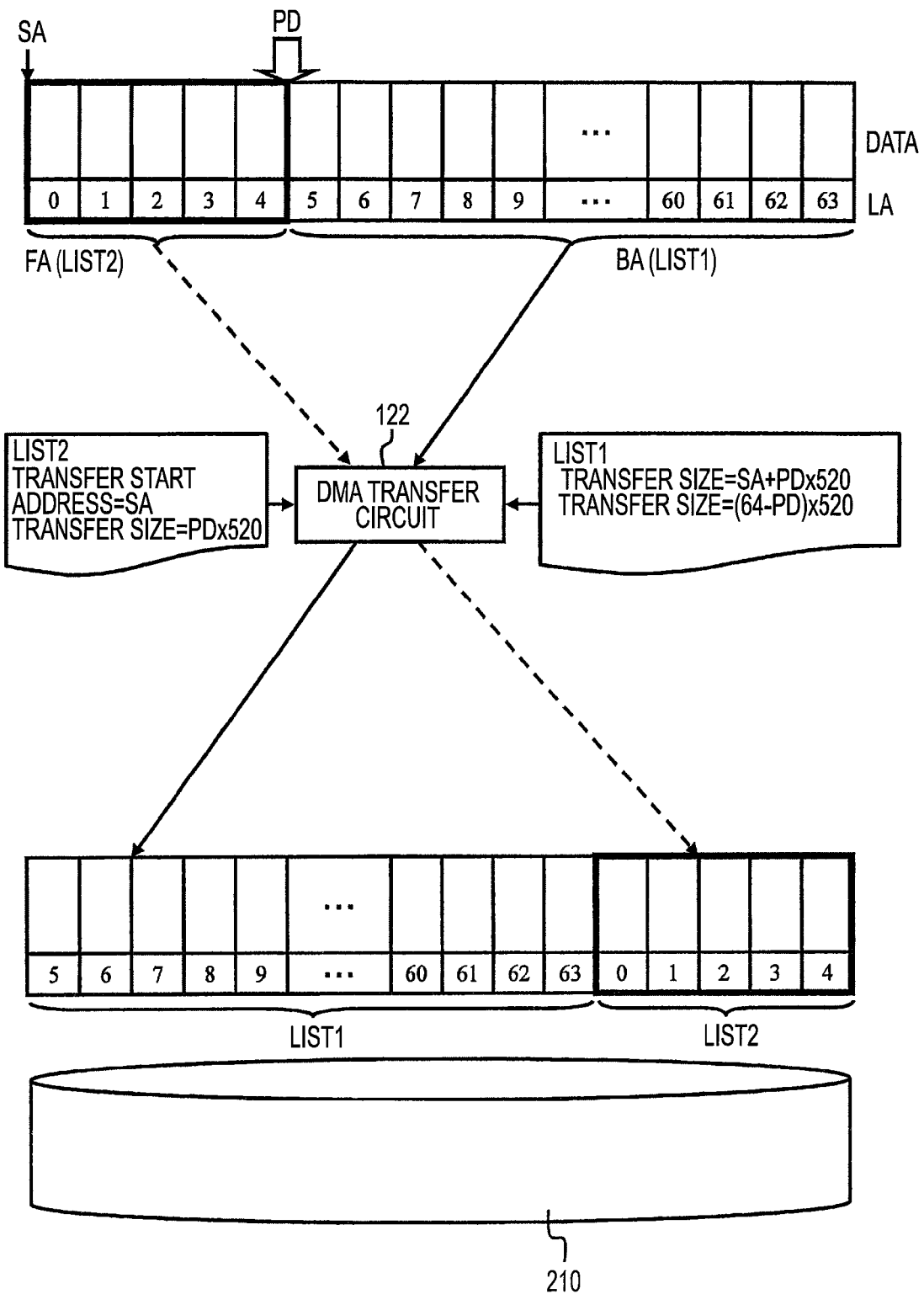
FIG. 15 is an explanation diagram showing a process of writing the data to the storage apparatus while counterchanging the data in the anterior and posterior parts around the divisional position.

Thus, as shown in the lower part of FIG. 15, each of the CHUNK is stored in the storage apparatus 210 with the data in the anterior part FA and the data in the posterior part counterchanged with each other. The process described above is executed on the sub-storage apparatus in a similar manner.

Figure 16:
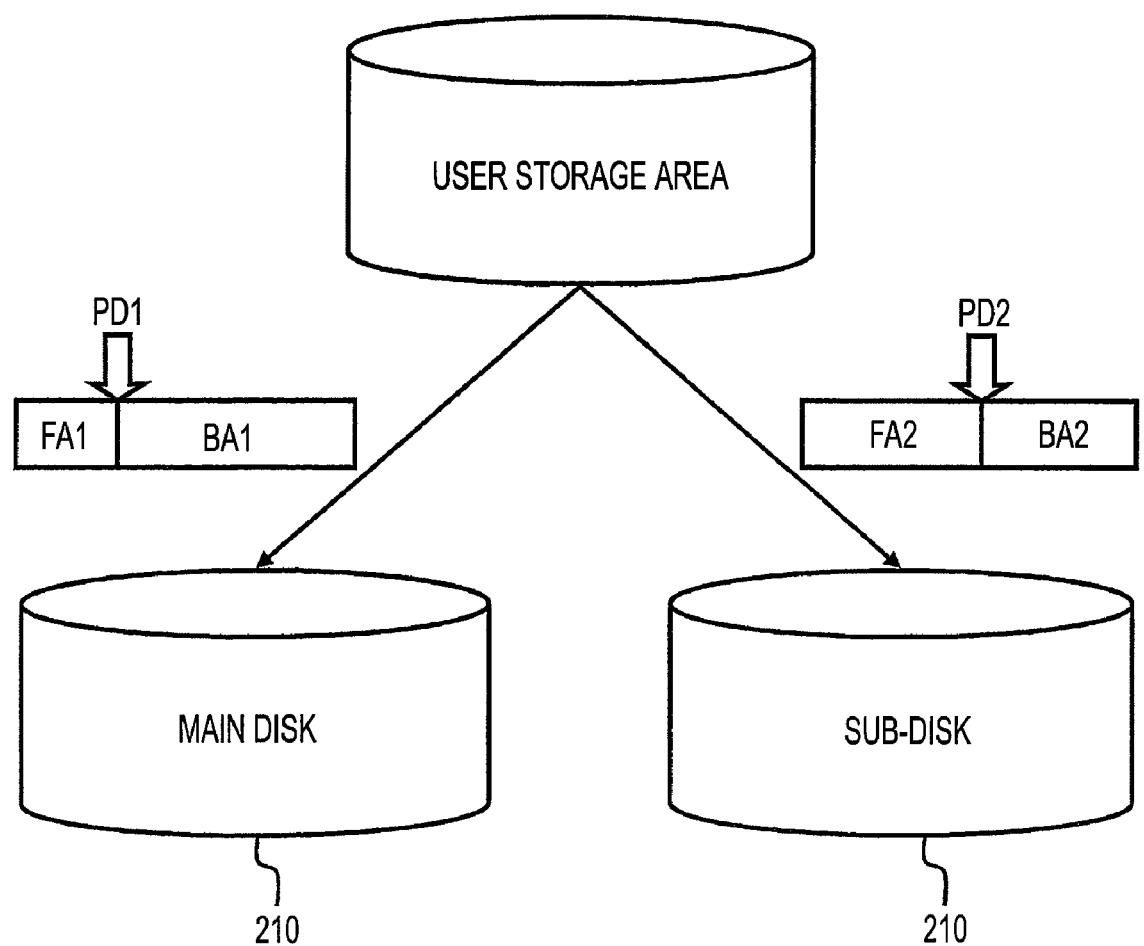
FIG. 16 is an explanatory diagram showing that the divisional position is determined for each storage apparatus.

FIG. 16 shows the case in which the divisional position of the data of the same CHUNK is different between the main storage apparatus and the sub-storage apparatus. The data to be stored in the main storage apparatus is divided at the divisional position PD1, and the order of the anterior and posterior parts is reversed. The data to be stored in the sub-storage apparatus is divided at another divisional position PD2, and the order of the anterior and posterior parts is reversed.

Figure 17:
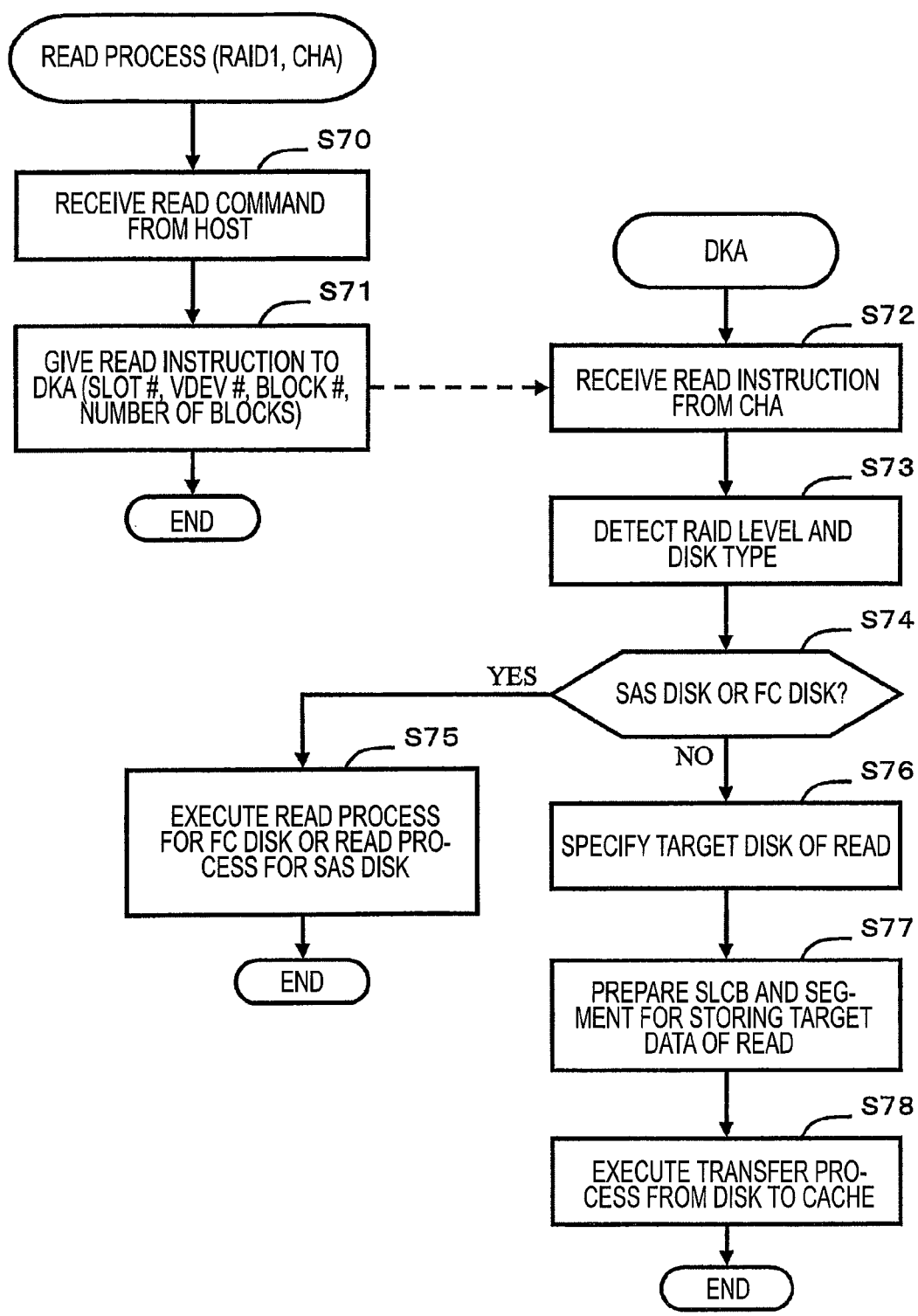
FIG. 17 is a flowchart showing a read process.

FIG. 17 is a flowchart showing a read process. When receiving a read command from the host 20 (S70), the CHA 110 gives instruction of reading out the data to the DKA 120 (S71). The instruction includes, for example, the slot number, the parity group number, the head block number of the target blocks of reading, and the number of blocks.

When receiving the instruction from the CHA 110 (S72), the DKA 120 obtains the RAID level and the disk type from the parity group management table T30 based on the parity group number (S73).

The DKA 120 determines whether or not the disk type is either one of the SAS disk and the FC disk (S74), if it is determined that the disk type is either one of the SAS disk and the FC disk (YES in S74), the DKA 120 executes either one of the read process for the SAS disk and the read process for the FC disk (S75).

If the storage apparatus 210 from which the date is read out is a disk other than the SAS disk or the FC disk (NO in S74), the DKA 120 specifies the storage apparatus 210 from which the data is read out (S76), and prepares the SLCB and the cache segment 131 for storing the read data (S77). The DKA 120 executes data transfer from the storage apparatus 210 to the cache memory 130 (S78).

Figure 18:
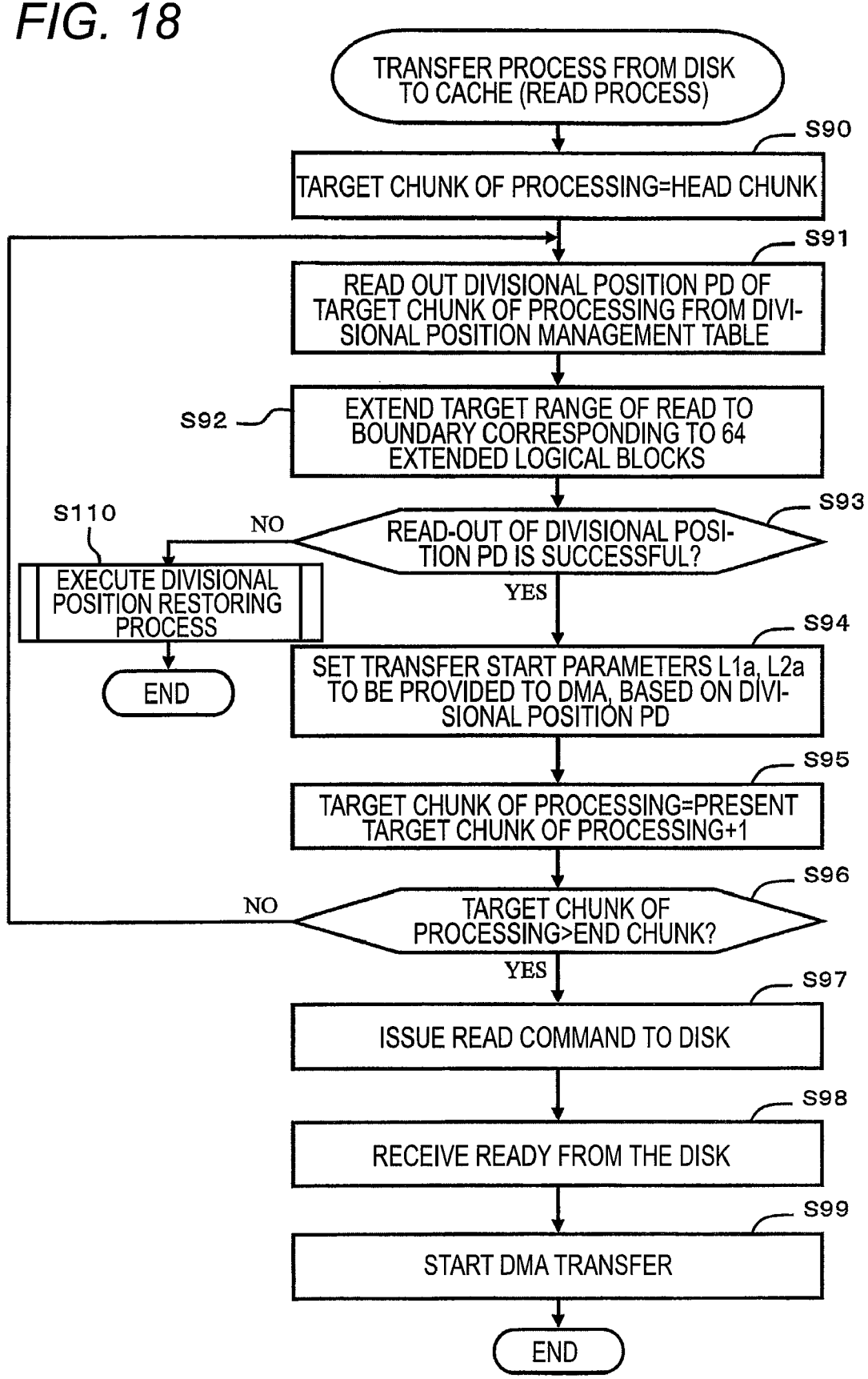
FIG. 18 is a flowchart showing details of step S78 shown in FIG. 17.

FIG. 18 is a flowchart of the process for executing the data transfer from the storage apparatus 210 to the cache memory 130, shown in FIG. 17 as the step S78. Here, the case of reading the data of a plurality of CHUNK will be explained.

The DKA 120 sets the head CHUNK as the target CHUNK of processing (S90). The DKA 120 reads out the divisional position PD, which is set in the target CHUNK of processing, from the divisional position management table T40 (S91).

Similarly to the write process executing the boundary correction shown in the part (b) of FIG. 13, the DKA 120 sets each of the read start block, and the number of blocks (number of read blocks) to be read out so as to match with the boundary of the 64 extended logical blocks (S92).

The read start block obtained by extending the read range is calculated along, for example, the following formula.

The read start block with the extended read range=the read start block without the extended read range/64↓×64

(the symbol ↓ represents truncation of the fractional part)

The number of read blocks with the extension is calculated with the following formula.

The number of read blocks with the extension=↓(read start block without the extension+the number of read blocks without the extension+63)/64↓×64−the read tart block with the extension The DKA 120 determines whether or not the divisional position PD can be read out normally from the management table T40 (S93). In either of the case in which the divisional position PD could not be read out normally from the management table T40, and the case in which the management flag of the divisional position PD is set to be invalid (NO in S93), the DKA 120 executes a divisional position restoring process described later with reference to FIG. 21 (S110).

If the divisional position PD with the management flag set to be valid could be read out normally from the management table T40 (YES in S93), the DKA 120 sets the transfer start parameters L1a, L2a to be input to the DMA circuit 122 based on the divisional position PD (S94).

The DKA 120 increments the target CHUNK of processing by one (S95), and repeatedly executes the steps S91 through S95 until the transfer start parameters L1a, L2a are set with respect to all of the CHUNK to be read out (S96). After finishing setting of the transfer start parameters L1a, L2a with respect to all of the CHUNK to be read out (YES in S96), the DKA 120 issues the read command to the storage apparatus 210 from which the data is read out (S97), and receives the ready notification from the storage apparatus (S98). The DKA 120 inputs each of the transfer start parameters L1a, L2a to the DMA circuit 122, and start the DMA transfer (S99).

Figure 19:
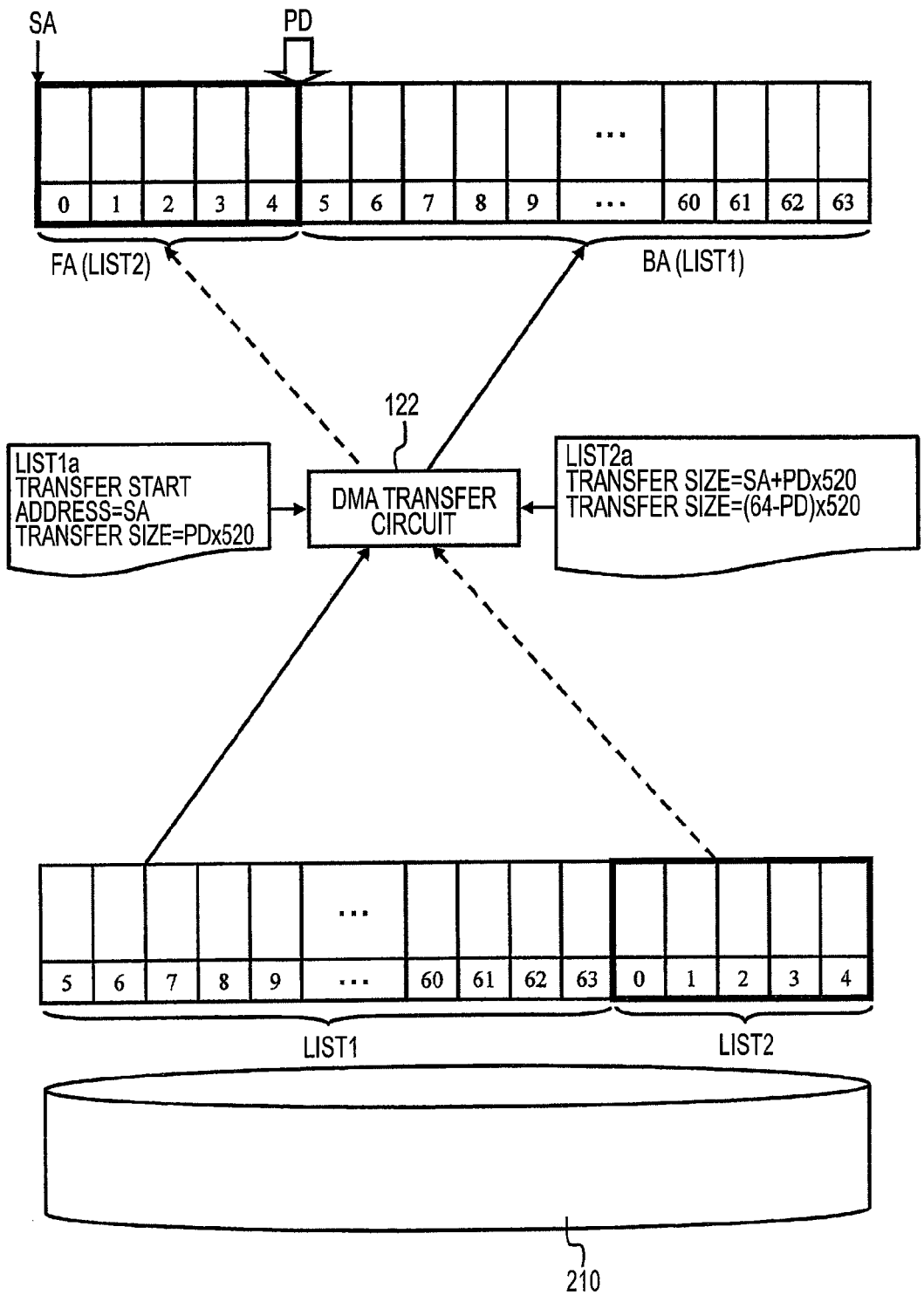
FIG. 19 is an explanatory diagram showing a process of transferring the data read out from the storage apparatus to a cache memory while counterchanging the anterior and posterior parts of the data.

FIG. 19 is an explanatory diagram showing the case of transferring the data from the storage apparatus 210 to the cache memory 130. As described with reference to FIGS. 14 and 15, the storage apparatus 210 stores the data in the anterior part FA and the data in the posterior part BA so as to have the locations counterchanged with each other. The parameter for reading out the data in the anterior part FA is stored in the transfer start parameter L1a input first to the DMA circuit 122. The transfer start parameter L2a input next thereto stores the parameters for reading out the data in the posterior part BA (S55).

In the transfer start parameter L1a for transferring the data in the anterior part FA, the transfer start address is obtained by adding the value, which is obtained by multiplying the divisional position PD by the extended logical block size of 520 bytes, to the head cache address SA of the target CHUNK of processing (i.e., the transfer start address=SA+520×PD). Further, in the transfer start parameter L1a, the value obtained by multiplying the value, which is obtained by subtracting the value of the divisional position PD from the total number of blocks of one CHUNK, by 520 bytes is set as the transfer size (i.e., the transfer size=(64-PD)×520).

In the transfer start parameter L2a for transferring the data in the posterior part BA, the head cache address SA of the target CHUNK of processing is set as the transfer start address (i.e., the transfer start address=SA). Further, in the transfer start parameter L2a, the value obtained by multiplying the divisional position PD by 520 bytes is set as the transfer size (i.e., the transfer size=520×PD).

Thus, as shown in FIG. 19, the data read out from the storage apparatus 210 in the correct order is transferred to the cache memory 130, thus the original data is restored.

Figure 20:
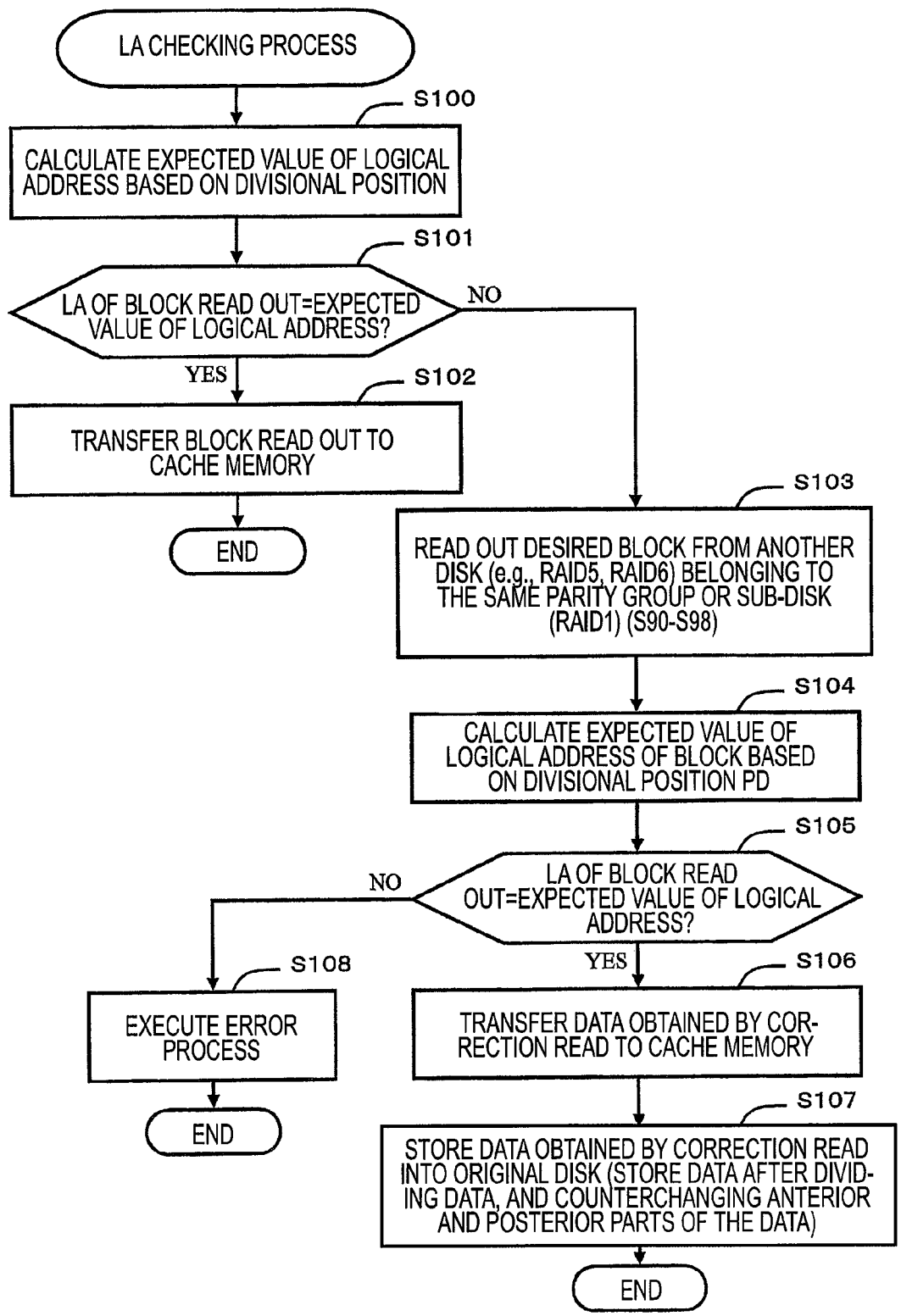
FIG. 20 is a flowchart showing a process of detecting error based on a value of address data appended to a block and an expected value (an expected logical address of the block) of the address data of the block.

FIG. 20 shows the LA checking process for determining whether or not the data read out from the storage apparatus 210 is correct based on the address data LA appended to each of the logical block and the expected value of the logical address calculated based on the divisional position PD. The LA checking section 122B in the DKA 120 executes the present process. The explanation will be presented taking the DKA 120 as the subject of the operations for the sake of convenience.

The DKA 120 calculates an expected value of the logical address of the extended logical block read out from the storage apparatus 210, based on the divisional position PD (S100). It should be noted that it is sufficient to calculate the value with respect only to the head extended logical block based on the divisional position PD. This is because with respect to other subsequent extended logical blocks, the value can be calculated by incrementing the head logical address by a predetermined value.

The DKA 120 calculates the expected value of the logical address of the extended logical block read out from the storage apparatus 210, based on the divisional position PD, and for each transfer list (S100). It should be noted that the expected value of the logical address based on the divisional position PD with respect only to the head extended logical block for each transfer list.

In the example shown in FIG. 19, the expected value of the transfer list L1 is "5," and the expected value of the transfer list L2 is "0." With respect to other subsequent extended blocks in one transfer list, the logical address can be calculated by incrementing the head logical address by a predetermined value.

The DKA 120 determines whether or not the value of the address data LA included in the extended logical block thus read out and the value of the address data to be set in the extended logical block match with each other (S101). Further, if the both values match with each other (YES in S101), the DKA 120 transfers the data, which is read out from the storage apparatus 210, to the cache memory 130 (S102).

In contrast, if the value of the address data LA included in the extended logical block thus read out does not match with the expected value thereof (NO in S101), it can be judged that a failure with a clerical error or the like occurs.

Therefore, in the case with the RAID5 or the like, the DKA 120 reads out other data and parity belonging to the same stripe from another storage apparatus 210 belonging to the same parity group along the steps S90 through S98 (S103).

The DKA 120 determines the expected value of the logical address of the data thus read out, based on the divisional position (S104), and judges whether or not the expected value of the logical address and the value of the actual address data LA attached to the data match with each other (S105).

If the expected value (in other words, the expected value of the address data LA) of the logical address and the real value of the address data LA match with each other (YES in S105), the DKA 120 executes a predetermined logic operation based on the data and the parity, thereby restoring the data in which the error is detected in the step S101. The data thus restored is called a data obtained by correction read, in the present specific example.

The DKA 120 transfers the data obtained by the correction read to the cache memory 130 (S106). Further, the DKA 120 stores the data, which is obtained by the correction read, in a predetermined area of the storage apparatus 210 in which the error is detected in the step S101 (S107). The predetermined area denotes the area where the error is detected in the step S101.

On the other hand, if the correction read fails (NO in S105), namely in the case in which an error is detected in reading out either one of other data and the parity belonging to the same stripe, an error process is executed (S108). In the error process, for example, occurrence of an unrecoverable error is notified to the user via the management terminal 30. It should be noted that in the case of the RAID6 using two different parities, up to two read errors can be accommodated.

Figure 21:
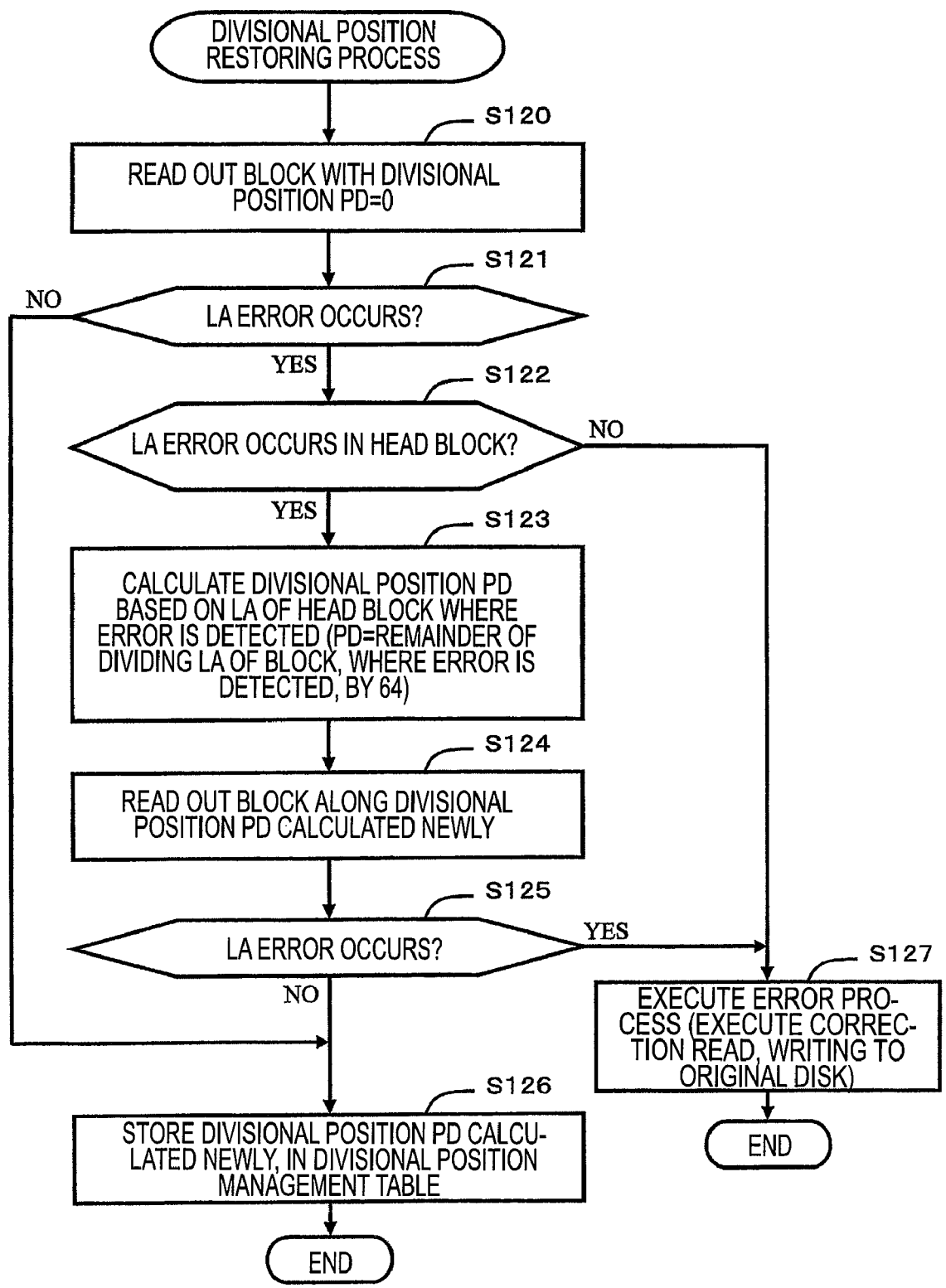
FIG. 21 is a flowchart showing a process for restoring the divisional position.

FIG. 21 is a flowchart showing details of the divisional position restoring process mentioned in the step S110 of FIG.

18. In the present process, in the case in which the divisional position PD could not be read out normally from the management table T40, the value of the divisional position PD is investigated and restored in a manner as described below.

The DKA 120 sets the value of the divisional position PD to be "0", and under the assumption that the divisional position PD is 0, reads out the data of the extended logical block from the storage apparatus 210 (S120). The DKA 120 determines whether or not the value of the address data LA included in the extended logical block thus read out and the expected value estimated from the divisional position "0" match with each other. The error of the mismatch between the both values is called an LA error for the sake of convenience.

The DKA 120 determines whether or not the LA error occurs (S121). If the LA error do not occur (NO in S121), it is the case in which the value of the divisional position PD happens to be "0." Therefore, the DKA 120 stores the value "0" of the divisional position thus detected in the management table T40 (S126).

From a probabilistic viewpoint, it is more likely to be determined to be NO in the step S121. If the LA error is detected (YES in S121), the DKA 120 then determines whether or not the LA error is detected in the head extended logical block (S122).

If the LA error is detected in a block other than the head block (NO in S122), it is the case in which the data of the CHUNK is damaged, and therefore the error process is executed (S127). In the error process, as described above, the correction read is executed to restore the data, and the data thus restored is written to the original area of the original storage apparatus 210.

If the LA error is detected in the head block (YES in S122), the DKA 120 calculates the divisional position PD based on the value of the address data LA actually included in the head block in which the error is detected (S123). In other words, the divisional position PD is assumed to be equal to the value of the address data LA of the head block.

The DKA 120 reads out another extended logical block from the storage apparatus 210 based on the divisional position PD newly calculated in the step S123 (S124), and determines whether or not the LA error is detected (S125). If the LA error occurs even when reading out the data along the divisional position PD calculated newly (YES in S125), it is the case in which the data of the CHUNK is actually damaged. Therefore, the error process described above is executed (S127).

If the LA error is not detected (NO in S125), it is the case in which the divisional position PD newly calculated in the step S123 is correct. Therefore, the DKA 120 stores the divisional position PD thus calculated newly in the management table T40 (S126).

Figure 22:
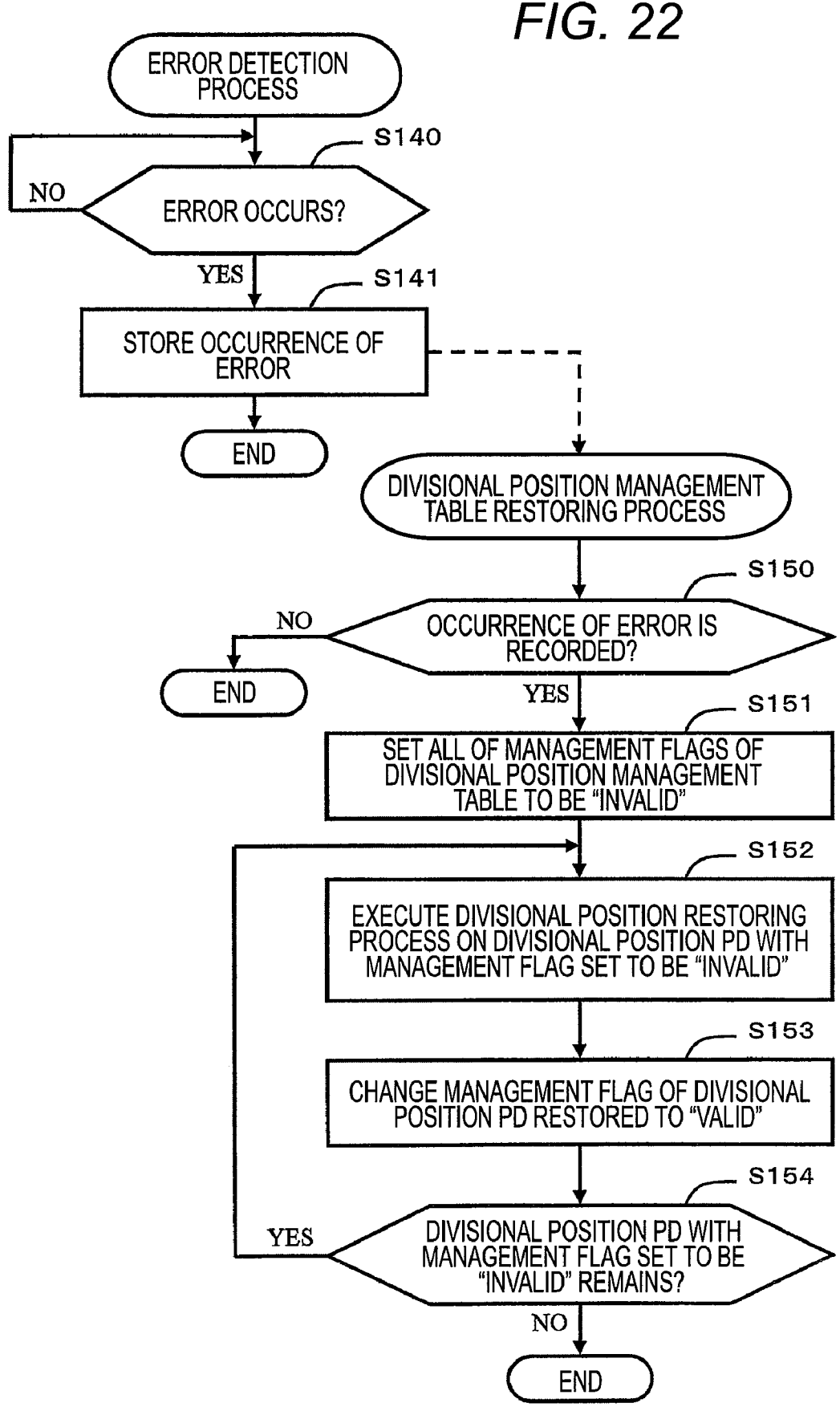
FIG. 22 is a flowchart showing a process for restoring the divisional position after a failure occurs.

FIG. 22 is a flowchart showing the process for restoring the divisional position PD when a memory failure or the like occurs. Here, it is assumed that the divisional position management table T40 is stored in the cache memory 130, for example.

Since the cache memory 130 is backed-up with a rechargeable battery or the like not shown, even in the case in which the power distribution to the storage controller 10 is stopped due to the power failure and so on, the cache memory 130 can hold the storage contents for a predetermined period of time. However, if, for example, the period of the power failure exceeds the backup time, the whole or a part of the divisional position management table T40 is lost, and there is a possibility that the data cannot correctly be read out in the next start-up. Alternatively, there might be the case in which although the divisional positions PD are stored in the management table T40, the values are not reliable.

Therefore, if a predetermined failure exerting an influence on the reliability of the management table T40 such as the power failure is detected (YES in S140), the DKA 120 stores occurrence of the predetermined failure in the nonvolatile storage area such as the shared memory 140 of the storage apparatus 210, and terminates the process (S141).

In the start-up after the failure is eliminated, the DKA 120 sets all of the management flags in the divisional position management table T40 to be invalid (S151). The DKA 120 restores each of the divisional positions PD with the management flag set to be invalid using the divisional position restoring process shown in FIG. 21 (S152), and sets the management flags of the divisional positions PD thus restored to be valid (S153).

The DKA 120 repeatedly executes the steps S152 and S153 until all of the management flags set to be valid (S154).

According to the present specific example configured as described above, presence or absence of an error can quickly be detected when reading out the data, the process time can be reduced and the reliability can be improved compared to the configuration of reading the data from the storage apparatus 210 immediately after the date is stored therein and checking the data.

According to the present specific example, since the error caused when writing can be detected with relative ease when reading out the data, the response performance can be improved without degrading the reliability of the storage controller 10 as a whole even in the case of using the storage apparatus 210 inferior in reliability such as the Serial ATA disk, thus the usability can be enhanced.

In the present specific example, in the case in which the divisional positions PD cannot normally be read out from the table T40 for managing the divisional positions PD, the divisional positions PD can be restored based on the value of the address data LA of the head block. Therefore, it is possible to cope with the case in which a failure such as the power failure occurs, thus the reliability can be enhanced. Although it is possible to store the divisional position management table T40 in a plurality of storage areas, in that case, the memory source is consumed. In contrast, in the present specific example, it is possible to automatically restore the divisional positions based on the address data without using redundant storage of the management table T40, thus the usability can be enhanced.

It should be noted that the present invention is not limited to the embodiment described above. Those skilled in the art can make various additions and modifications within the scope of the present invention.

What is claimed is:

1. A storage controller adapted to control input and output of data between a storage apparatus handling the data by a first block and a host computer handling the data by the first block, the storage controller comprising:
 a first communication control device adapted to transmit and receive the data with the host computer;
 an address data appending device adapted, with respect to the data, which is received by the first communication control device, and composed of one or more said first blocks, to append predetermined address data generated based on a logical address of each of the first blocks to said each of the first blocks, thereby generating data composed of one or more second blocks with a size larger than the size of the first block as much as the size of the predetermined address data;

a memory device adapted to store the data composed of the second blocks appended with the predetermined address data;

a second communication control device adapted to store the data, which is received from the memory device, in the storage apparatus, and to transfer the data, which is read out from the storage apparatus, to the memory device; and a checking device adapted to check correspondence between the logical address and the address data, wherein the second communication control device, when transferring the data from the memory device to the storage apparatus, generates another logical address different from the logical address of each of the first blocks based on a predetermined rule, makes said another logical address correspond to each of the second blocks of the data received from the memory device, transfers the data, which is received from the memory device, to the storage apparatus so as to be stored in the storage apparatus at a position corresponding to said another logical address, and stores correspondence between the logical address and said another logical address in a management table, wherein the checking device, when transferring the data from the storage apparatus to the memory device, based on the correspondence obtained from the management table, reads out the data composed of the second blocks from the storage apparatus at the position corresponding to said another logical address, compares the logical address corresponding to each of the second blocks and the address data included in each of the second blocks with respect to the data composed of the second blocks and read out from said another logical address, transfers the data from the storage apparatus to the memory device in the case in which the logical address and the address data match with each other, and detects occurrence of an error in the case in which the logical address and the address data fail to match with each other, and wherein the predetermined rule includes dividing the data composed of the second blocks at a divisional position designated, and counterchanging the order of the divided data.

2. The storage controller according to claim 1, wherein the predetermined rule includes designating the divisional position at the head of the data composed of the second blocks, to eliminate dividing the data.

3. The storage controller according to claim 1, wherein the divisional position is changed every time the data is transferred from the memory device to the storage apparatus.

4. The storage controller according to claim 1, wherein the management table stores the divisional position.

5. The storage controller according to claim 1, wherein the management table stores the divisional position and validity identification data.

6. The storage controller according to claim 5, wherein the validity identification data is set to be invalid in response to occurrence of a failure.

7. The storage controller according to claim 1, further comprising:

a correspondence restoring part adapted, in the case in which the correspondence fails to be read out from the management table, to restore the correspondence and to re-register the correspondence in the management table, wherein the correspondence restoring part restores the correspondence based on the address data appended to the head block of the data composed of the second blocks.

8. The storage controller according to claim 1, wherein the divisional position is set by using a random number or a pseudorandom number, or by adding or subtracting a predetermined value to or from the previous divisional position.

9. The storage controller according to claim 1, wherein the first communication control device includes a first direct memory access circuit adapted to transfer data between a communication device coupled to the host computer and the memory device, wherein the second communication device includes a second direct memory access circuit adapted to transfer data between the memory device and the storage apparatus, wherein the address data appending device is provided in the first direct memory access circuit, wherein the checking device is provided in the second direct memory access circuit, and wherein the size of the first block is 512 bytes, the size of the address data is 8 bytes, and the size of the second block is 520 bytes.

10. A storage controller adapted to control input and output of data between a storage apparatus handling the data by a first block and a host computer handling the data by the first block, the storage controller comprising:

a first communication control device adapted to transmit and receive the data with the host computer;

an address data appending device adapted, with respect to the data, which is received by the first communication control device, and composed of one or more said first blocks, to append predetermined address data generated based on a logical address of each of the first blocks to said each of the first blocks, thereby generating data composed of one or more second blocks with a size larger than the size of the first block as much as the size of the predetermined address data;

a memory device adapted to store the data composed of the second blocks appended with the predetermined address data;

a second communication control device adapted to store the data, which is received from the memory device, in the storage apparatus, and to transfer the data, which is read out from the storage apparatus, to the memory device; and a checking device adapted to check correspondence between the logical address and the address data, wherein the second communication control device, when transferring the data from the memory device to the storage apparatus, generates another logical address different from the logical address of each of the first blocks based on a predetermined rule, makes said another logical address correspond to each of the second blocks of the data received from the memory device, transfers the data, which is received from the memory device, to the storage apparatus so as to be stored in the storage apparatus at a position corresponding to said another logical address, and stores correspondence between the logical address and said another logical address in a management table, and wherein the checking device, when transferring the data from the storage apparatus to the memory device, based on the correspondence obtained from the management table, reads out the data composed of the second blocks from the storage apparatus at the position corresponding to said another logical address, compares the logical address corresponding to each of the second blocks and the address data included in each of the second blocks with respect to the data composed of the second blocks and read out from said another logical address, transfers the data from the storage apparatus to the memory device in the case in which the logical address and the address data match with each other, and detects occurrence of an error in the case in which the logical address and the address data fail to match with each other, and wherein the predetermined rule includes dividing the data with a predetermined size, composed of a predetermined number of said second blocks at a divisional position designated arbitrarily and a boundary of the second blocks, and counterchanging the order of the divided data.

11. The storage controller according to claim 10, wherein the predetermined number is a value obtained by dividing the least common multiple of the size of the first block and the size of the second block by the size of the second block.

12. The storage controller according to claim 10, wherein the divisional position is changed discretely by the predetermined size.

13. A method for controlling a storage controller adapted to control input and output of data between a storage apparatus and a host computer, comprising the steps of:

receiving data composed of one or more first blocks from the host computer based on a write command;

generating data composed of one or more second blocks with a size larger than the size of the first block as much as a size of predetermined address data, by appending the predetermined address data generated based on a logical address of each of the first blocks to said each of the first blocks, with respect to the data, composed of one or more said first blocks;

storing the data composed of the second blocks appended with the predetermined address data in a memory device;

generating another logical address different from the logical address of each of the first blocks based on a predetermined rule;

transferring the data, which is read out from the memory device, to the storage apparatus, making said another logical address correspond to each of the second block of the data read out from the memory device, so as to be stored in the storage apparatus at a position corresponding to said another logical address;

storing correspondence between the logical address and said another logical address in a management table;

reading out the correspondence from the management table based on a read request;

reading out data composed of the second blocks from the storage apparatus at the location corresponding said another logical address based on the correspondence read out;

comparing the logical address corresponding to each of the second blocks and the address data included in each of the second blocks, with respect to the data composed of the second blocks read out from said another logical address;

transferring data from the storage apparatus to the memory device in the case in which the logical address and the address data match with each other; and detecting occurrence of a failure in the case in which the logical address and the address data fail to match with each other, wherein the predetermined rule includes dividing the data composed of the second blocks at a divisional position designated, and counterchanging the order of the divided data.

\* \* \* \* \*